United States Patent [19]

McMillan et al.

[11] Patent Number: 5,075,693
[45] Date of Patent: Dec. 24, 1991

[54] PRIMARY LAND ARCTIC NAVIGATION SYSTEM

[75] Inventors: Joseph C. McMillan, Kanata; Marc Dion, Alymer; David F. Liang, Kanata; Michael E. Vinnins; Barry G. Fletcher, both of Smith Falls, all of Canada

[73] Assignee: Her Majesty The Queen in Right of Canada, as represented by The Minister of National Defence, Canada

[21] Appl. No.: 416,743

[22] Filed: Oct. 5, 1989

[30] Foreign Application Priority Data

Oct. 5, 1988 [CA] Canada .................................. 579437

[51] Int. Cl.$^5$ .................. G01C 21/04; G06G 7/78
[52] U.S. Cl. ............................ 342/457; 364/449; 364/454
[58] Field of Search ............. 342/457, 357; 364/449, 364/450, 453, 954, 457

[56] References Cited

U.S. PATENT DOCUMENTS

| | | | |
|---|---|---|---|
| 4,166,406 | 9/1979 | Maughmer | 364/454 X |
| 4,459,667 | 7/1984 | Takeuchi et al. | 364/449 X |
| 4,680,715 | 7/1987 | Pawelek | 364/449 |
| 4,725,843 | 2/1988 | Suzuki et al. | 342/459 |
| 4,731,613 | 3/1988 | Endo et al. | 342/357 |
| 4,743,913 | 5/1988 | Takai | 342/457 |
| 4,837,700 | 6/1989 | Ando et al. | 364/449 |
| 4,899,285 | 2/1990 | Nakayama et al. | 364/453 |
| 4,903,212 | 2/1990 | Yokouchi et al. | 364/449 |

*Primary Examiner*—Gilberto Barron, Jr.
*Attorney, Agent, or Firm*—Hayes, Soloway, Hennessey & Hage

[57] ABSTRACT

A land navigation system for use in a vehicle, comprises, in combination, a device providing a signal representative of the heading of the vehicle, a device providing a signal representative of the speed of the vehicle, and a computing apparatus responsive to the vehicle heading representative signal and the vehicle speed representative signal for providing a continuous indication of the position, altitude and heading of the vehicle.

1 Claim, 9 Drawing Sheets

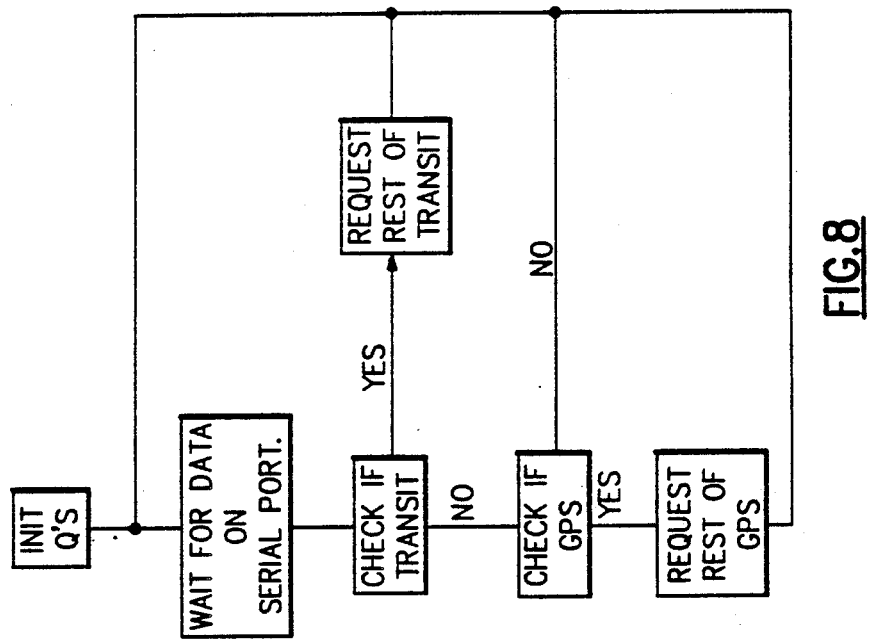
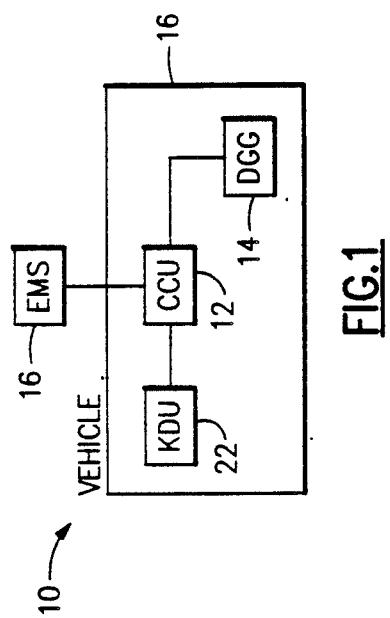

PRIMARY LAND ARCTIC NAVIGATION SYSTEM

The present invention relates, generally, to a land navigation system and, more specifically, to a system for navigating a land vehicle in the arctic.

BACKGROUND OF THE INVENTION

Perhaps the most stringent requirement for land navigation is imposed by winter operations in the high arctic. The serious consequences of being lost or failing to find a supply dump in the arctic make reliability and accuracy of navigational systems vital necessities. Because of weather related poor visibility conditions, it may also be necessary to navigate by instrument very close to the destination in order to actually find it. Furthermore, a combination of circumstances conspire to make the arctic a particularly difficult area in which to navigate by conventional means.

The Canadian arctic, from 60° to 85° latitude, consists of about 7,000,000 square kilometers, of which roughly half is land. To the untrained eye of a non-inhabitant, most of this area appears completely barren and featureless, especially during the long winter period where land-water division is obscured. Certainly above the tree line any movement beyond line of sight requires some non-trivial navigation capability. There are generally no rail or road systems and, in most areas, no permanent recognizable landmarks. Accordingly, normal map reading skills are completely inadequate. Frequent extended periods of low visibility also interfere with visual navigation and make celestial navigation unreliable at best. In any case, sextants and sun compasses are not sufficiently accurate.

In many ways, arctic navigation is similar to desert navigation, except that there are several added complications. The area in question is unique in containing the north geomagnetic pole, which makes the use of a handheld magnetic compass futile over most of this area because the geomagnetic field lines at the magnetic pole are vertical whereas a compass relies on the horizontal component of the field. It is well known that random fluctuations in the direction of the field vector about its mean value will induce heading errors of magnitude inversely proportional to the horizontal field strength.

While various navigational aids are available, there is currently no vehicle navigation system capable of operating under conditions described above. Radio navigation aids generally do not extend coverage through the arctic. The "Transit" satellite system provides some position fixing capability provided that velocity and altitude measurements are continuously available. Since the Transit satellites are in polar orbits, fixes can be obtained more frequently at higher latitudes, with more than one fix per hour expected above 60°. The accuracy of a Transit position fix depends upon the accuracy of the velocity provided, but can be quite adequate, especially with a 2-channel receiver (to remove the ionospheric effect) in stationary mode. When it becomes available, the Global Positioning System (GPS) will provide position and velocity data quite adequate, even with a C/A code receiver. Until it is fully operational however, the gaps in coverage prevent total reliance on GPS.

This still leaves a need to deadreckon (DR) between Transit fixes or through GPS gaps, so that vehicle velocity determination cannot be avoided. The length of the velocity vector, or the speed, can be easily estimated by using a vehicle odometer output; however, vehicle heading presents some difficulty. The first alternative to magnetic direction finding is gyrocompassing which is based on the fact that the horizontal component of the earth's rotation rate is in the north direction. Gyrocompassing becomes more difficult at higher latitudes where the horizontal earth rate decreases quickly as one moves north. Thus, the gyrocompassing accuracy of a given sensor varies as the secant of the latitude. In practice, for each gyro, there is a latitude above which it will not settle at all. For moderately priced units suitable for land vehicles, this is typically given as about 80°. The present location of the geomagnetic pole is such that the land area where magnetic heading is not available (using a magnetometer) probably does not intersect the land area where gyrocompassing is not possible. Neither of these regions is sharply delineated in fact. Rather each heading measurement becomes increasingly less accurate moving towards and into its corresponding region. The point at which each measurement becomes useless depends on the particular sensors chosen, how they are used, and the magnetic conditions at the time. The important point to note is that in the extreme northwest, which is the area of greatest difficulty, the two methods complement each other, with magnetic heading improving as gyrocompass heading deteriorates and vice versa.

SUMMARY OF THE INVENTION

The present invention seeks to provide a highly reliable, moderately accurate and moderately priced, non-radiating, automatic, integrated, multi-sensor navigation system for all weather off the road use. Although designed primarily to meet an arctic requirement, the present invention would be just as applicable for desert navigation, or for any application in which reliability and accuracy are a priority or where simpler and less costly methods are ineffective.

The present invention provides a land navigation system for use in a vehicle, comprising, in combination: means for providing a signal representative of the heading of the vehicle, means for providing a signal representative of the speed of the vehicle, means responsive to the vehicle heading representative signal and the vehicle speed representative signal for providing a continuous indication of the position, altitude and heading of the vehicle.

BRIEF DESCRIPTION OF THE DRAWINGS

These and other features of the invention will become more apparent from the following description in which reference is made to the appended drawings, wherein:

FIG. 1 is a block diagram schematically illustrating four basic components of one embodiment of the land navigation system of the present invention;

FIG. 5 is a diagrammatic view schematically illustrating a layout for a keypad used for entering information into the system of the present invention;

FIG. 8 is a block diagram schematically illustrating the structure of a satellite receiver monitoring routine in accordance with the preferred embodiment of the invention;

DESCRIPTION OF THE PREFERRED EMBODIMENT

Figure 2:
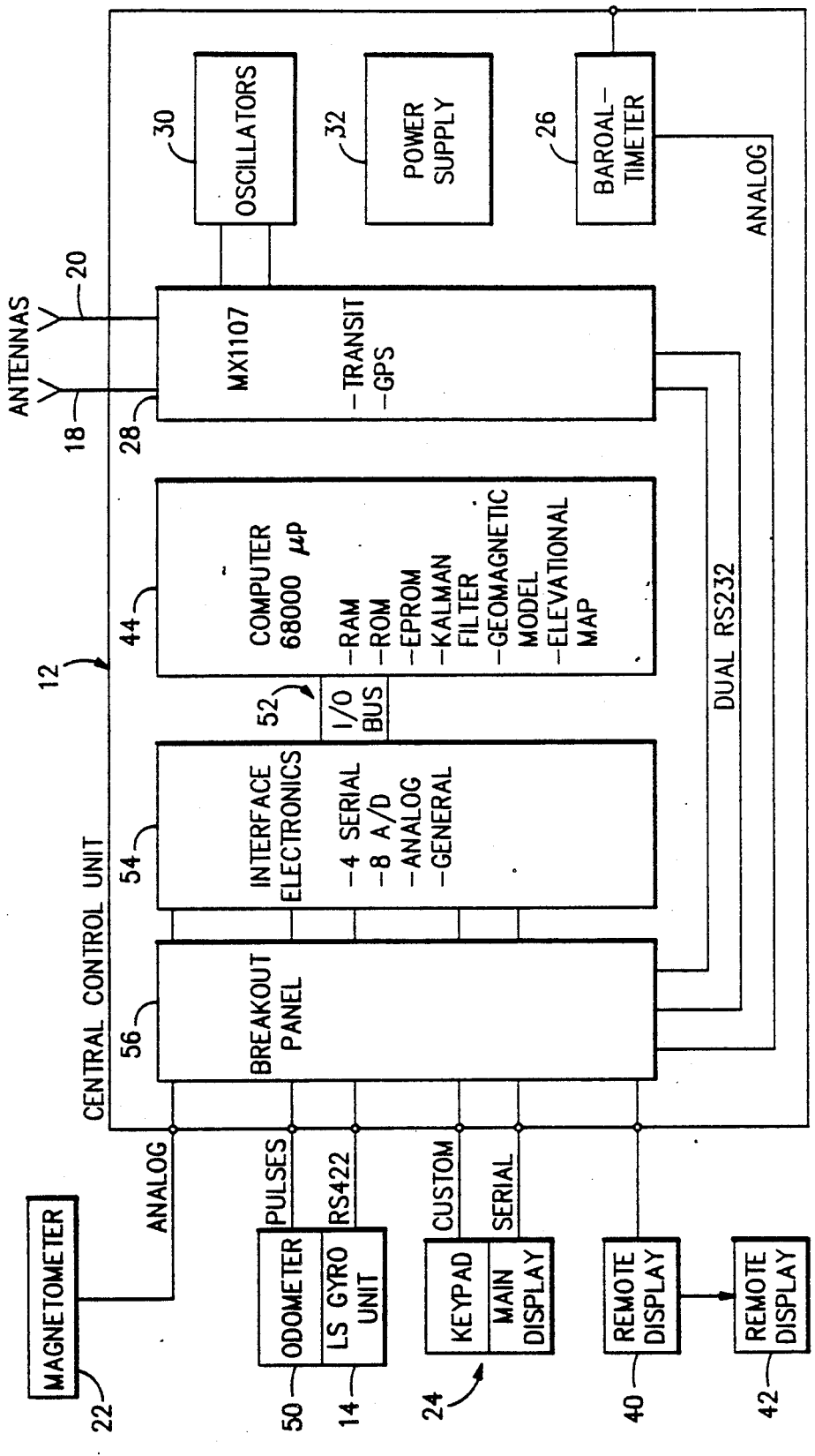
FIG. 2 is a block diagram schematically illustrating in more detail the basic components of one embodiment of the land navigation system of the present invention.
Figure 3:
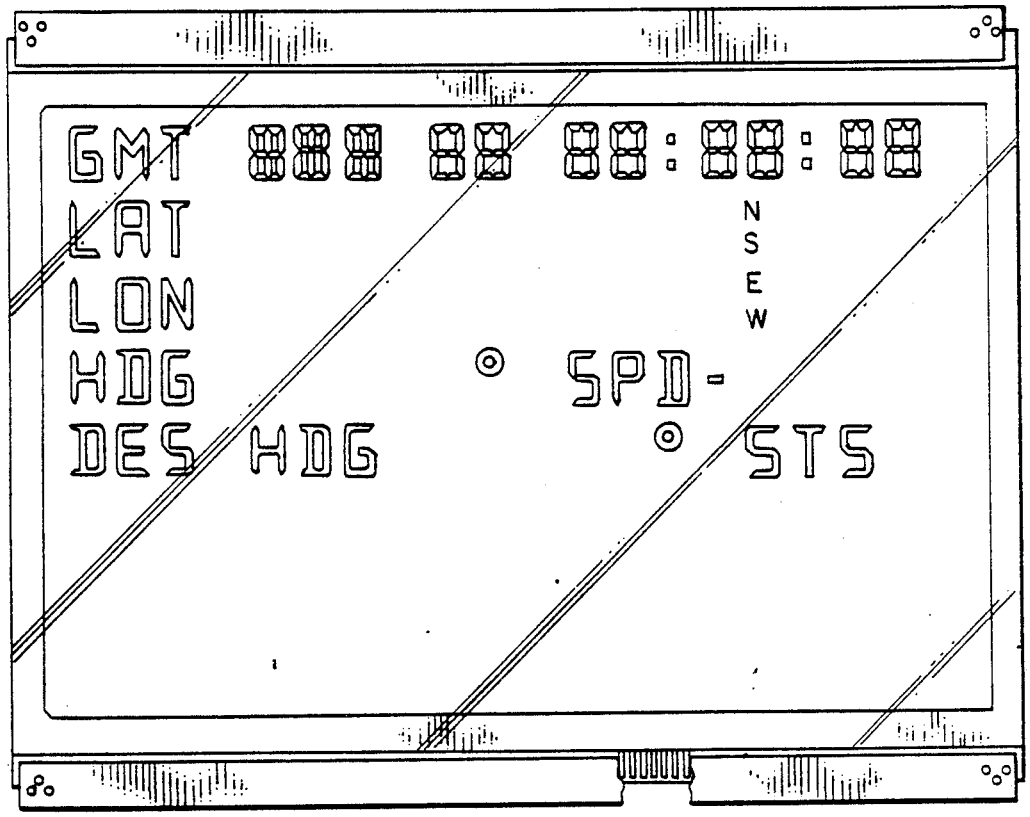
FIGS. 3 and 4 are front elevational views of a main video display and a remote video display.

In general, the present invention provides a multi-sensor navigation system which includes at least one sensing means which continuously provides electrical signals representative of the heading of the vehicle and a sensing means which continuously provides electrical signals representative of the speed of the vehicle. These signals are processed, and specifically deadreckoned, by a microprocessor which provides optimal estimates of vehicle position, speed and heading. The primary navigation information, i.e. the vehicle heading and speed signals, are continuously provided by a gyrocompass/directional gyro and an odometer pickoff as explained more fully below. These are autonomous sensors (not relying on any external transmissions) and hence are quite reliable. Additional sensors may be used to provide corrections to this deadreckoned position and velocity.

In the preferred embodiment of the invention, absolute position signals are obtained at aperiodic intervals from the Transit Satellite System and/or from the Global Positioning System (GPS) when GPS satellite coverage becomes adequate. These signals are received by a satellite receiver which includes a two channel Transit receiver and a single channel C/A code GPS receiver. Since the Transit System requires height information, a baro-altimeter is provided and the microprocessor combines the output of the baro-altimeter with computer generated data from an elevation map to determine an optimal altitude estimate. The receiver is completely controlled by a microprocessor.

A magnetometer provides an additional magnetic heading signal from which a true heading estimate is derived from a computer generated field model and a magnetic calibration function. The microprocessor uses this signal to augment the directional gyro heading output. Thus, by using deadreckoning along with other aiding sensors, an optimal estimate of the current position and velocity of the vehicle is always available.

As explained more fully later, sensor error detection and rejection routines are implemented to protect the integrated solution from bad measurements.

Virtually all hardware used in the present invention is commercially available at the circuit board level or above except for a General Purpose Interface (GPI), a Quad Serial Port (QSP) and a Analog board briefly described later.

With reference to FIG. 1, the navigation system of the preferred embodiment 10 of the present invention comprises a central control unit 12 which houses system electronics, satellite receivers, a microprocessor or computer and interfaces which can be mounted, shock mounted if necessary, anywhere in the vehicle, a directional gyro/gyrocompass unit 14, which is hard mounted on the vehicle 16, preferably near the centre of gravity, externally mounted sensors including a Transit antenna 18, a GPS antenna 20 and magnetometer 22, and a keypad/display unit 24.

Control Unit 12 contains the interfaces required to collect and digitize sensor outputs as well as a microprocessor 44 and the memory to store and run the software which performs navigational and way-pointing algorithms, data pre-filtering and Kalman filtering algorithms, failure detection and error rejection algorithms, and operator interaction and display driving algorithms. The control unit also contains some of the navigation sensors: namely, the baro-altimeter 26 and Transit/GPS satellite receiver 28 in the form of printed circuit boards or cards and the necessary oscillators 30. The Central Control Unit also includes a power supply 32 to power all of the components in the Central Control Unit.

Central Control Unit 12 receives input from the keypad/display unit, Directional Gyro/Gyrocompass Unit, magnetometer and satellite antennas and provides serial output to remote video displays 40 and 42 and the Keypad/Display Unit. It also provides power to the Directional Gyro/Gyrocompass Unit, the Keypad/Display Unit, the magnetometer and the remote display while it obtains its power from the vehicle batteries.

The Directional Gyro/Gyrocompass Unit performs the physical measurements necessary to provide the required real time inertial heading and attitude data for processing by the Central Control Unit. In general, the gyro unit should be capable of dual mode operation: as a gyrocompass, while the vehicle is stationary, and as a directional gyro while the vehicle is in motion. It should also provide dynamic pitch and roll attitude output signals. Still further, it should also be capable of being controlled by a computer (preferably over an RS422 or RS232 serial line), with no direct operator interaction. Finally, the gyro unit should be able of accurately tracking the expected maximum angular rate of the host vehicle and the heading and attitude output should be available at least once per second, preferably at a rate of 10 Hz.

A gyro unit which is suitable for the purposes of the present invention is that manufactured by Lear Siegler under the name "Vehicle Reference Unit" (VRU). This unit contains the necessary gyros, accelerometers, electronics and processor(s) (not shown) to perform true north seeking (gyrocompassing) when the vehicle is stationary, and, thereafter, dynamically maintain the vehicle's heading, pitch and roll. The Directional Gyro/Gyrocompass Unit communicates with the Central Control Unit via an RS422 serial line 36. In terms of accuracy, the heading drift rate on the Lear Siegler VRU has been measured to be less that 1.0 degree per hour and normally less than 0.5 degrees per hour. The pitch and roll accuracy were less precisely measured, but are believed to be better than 2 degrees each.

The speed sensor device 50 is an odometer pickoff type which converts odometer cable rotation into electrical pulses. A unit manufactured by Lear Siegler under the name "Distance Measurement Unit" (DMU) is suitable for the purposes of the present invention. The DMU speed sensor provides a resolution of about 355 pulses per meter on a Canadian forces M577 vehicle odometer cable (or any other vehicle odometer with similar revolutions per meter). This results in a 0.01 km/hr speed resolution at a 1 Hz sample rate. The unit also indicates forward or reverse vehicle motion.

Magnetometers suitable for the purposes of the present invention are the Marinex compass sensor unit 900111, which is a 2-axis, gimballed marine magnetometer, and the Humphrey FD31-0101-1, which is a 3-axis strapdown unit. The former unit measures magnetic field strength in the local horizontal frame of the vehicle with one axis being the projection of the centerline of the vehicle into the horizontal plane. The 3-axis strapdown unit measures three orthogonal components of the magnetic field strength in a vehicle fixed frame. The strapdown unit requires vehicle attitude information, which is available from the Lear Siegler VRU, to project these into the locally level frame. Without vehicle attitude input, the vehicle would have to be assumed to be level and this would result in errors. Since this unit must be mounted externally of the vehicle, it must be very rugged and capable of operating at very low temperatures ($-55°$ C.). For the unit to function properly under very cold conditions, it may be necessary to enclose the unit and force warm from the vehicle into the enclosure.

A baro-altimeter suitable for the present invention is the high output pressure transducer manufactured by Setra Systems, Inc. under Model No. 205-2. This is a small, light weight, rugged and sensitive, low power sensor. The linear pressure range (gage and absolute) for the unit is from 0 to 25 psi. to completely cover the expected barometric range since the region of primary interest is from 10 to 20 psi.

The satellite receiver 28 should have the capability to selecting and tracking the best one of several coincident (interfering) satellite passes. This is required because at higher latitudes the number of coincident passes increases and results in more interference. The receiver should also be capable of complete remote control by the computer (preferably over an RS232 or similar serial interface), so that no direct operator interaction is required. Since the antennas must be mounted externally of the vehicle they must be sufficiently rugged and must operate at very low temperatures.

The receiver must provide the correct information necessary for the system to optimally integrate the Transit position fixes, and the GPS position and velocity measurements. This includes Transit fix mark (time of fix validity), Transit satellite direction of travel (N/S and E/W or rising quadrant), Transit satellite maximum elevation angle, Transit fix validity (quality) flag, Transit fix Latitude and Longitude, Transit Satellite ID, GPS Latitude and Longitude, GPS north and east velocity components, GPS north and east geometric dilution of precision (GDOP), and number of GPS satellites visible. The GPS data must be continuously available at a rate of at least 0.1 Hz.

A satellite receiver suitable for the present invention is the Magnavox MX1107R with the GPS upgrade. This unit has a two channel Transit receiver and a C/A code GPS receiver.

The Keypad/Display Unit is a hand-held or lap held unit which provides equipment-to-user interface to enable the operator to enter and extract information required to meet the mission requirements. The information shown on each display is specific to that display's function. The system may include one keypad and three displays including a main display, a remote commander display, and a remote driver display.

Figure 4:
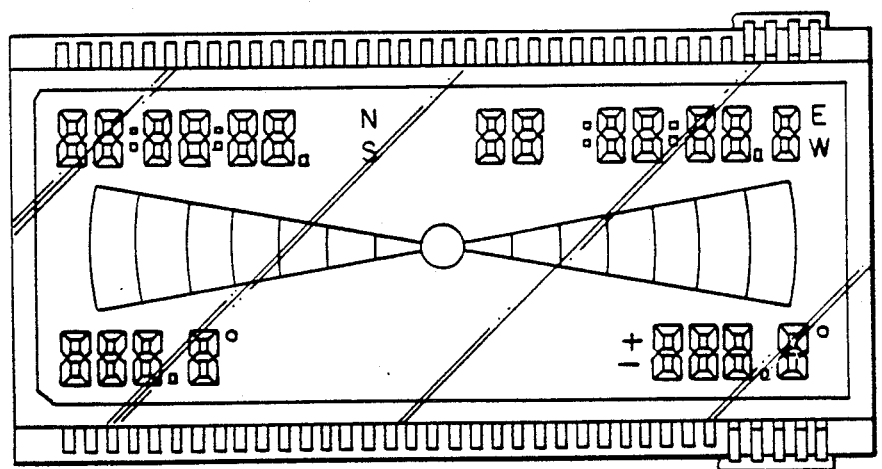

The main display unit contains a display and keyboard with all indicators and controls required for system operation. This display uses 8 rows of 20 characters, and is visible under all lighting conditions within the vehicle. The layout for this display is shown in FIG. 4. The keypad has twenty keys arranged as a four row by five column matrix. The main display unit may be either hand held or lap held and remotely connected via cable to the Central Control Unit. The display unit is portable to allow unrestrained access and use within the vehicle.

All three displays continuously display the vehicles geodetic position (WGS-84) in full latitude and longitude, in degrees, minutes, seconds and fractions of a second, to a resolution of 0.1 second in each coordinate direction. UTM (Universal Transverse Mercator) northings and eastings are also continuously displayed on the Main Display to a resolution of 10 meters.

The Main display continuously displays the vehicle's true and desired heading in degrees, to a resolution of 0.1 degrees (clockwise from true north to the vehicle lubber line). The Driver's and Commander's displays have a switch to select, for display, either the actual heading or the difference between the actual and desired heading, in degrees, to a resolution of 0.1 degree. The Driver's and Commander's displays also continuously display an analog representation of the difference between the actual and desired heading, in the form of a "heading to steer" indicator, showing the direction and magnitude of the desired steering correction needed to bring the vehicle onto the desired course.

The Main Display can on request display the bearing from one selected waypoint to another (the present vehicle position being a waypoint) to the nearest 0.1 degrees. This unit can also on request display the distance to travel (range) to the next waypoint to the nearest meter.

Position entry is accepted by the system in either UTM northings and eastings, in kilometers, or in WGS-84 latitude and longitude coordinates in either degrees, minutes and seconds, or in degrees and minutes (with decimal minutes) or in degrees (with decimal degrees). The resolution accepted is equivalent of 0.1 arcsecond (about 3.0 meters) in each coordinate direction.

The system allows keypad entry of up to six way positions in either UTM, northings and eastings or in WGS-84 latitude and longitude, as described in 4.3.1 above, to a resolution of 0.1 arcsecond.

Keypad entry of the vehicle's heading is accepted to the nearest 0.1 degree (with respect to the vehicle lubber line and true north). All keypad entries are echoed to the user on the main display to provide positive feedback and confirmation of input.

MICROPROCESSOR

The computer system employs a VMEbus configuration for high-speed access to a co-processor and memories. While not limited thereto, the processor module selected for the present invention is the Motorola MVME110. It is a high performance processing module using an MC68000 16-bit microprocessor operating at 8 Mhz. The module provides full support for the VMEbus addressing and control logic and is operable as the system controller. It also provides support for the I/O Channel used in all the I/O operations and includes a RS-232C serial port and a triple 16-bit counter/timer. On-board sockets are used to provide 128 Kbytes of EPROM and 32 Kbytes of write-protectable RAM.

The system incorporates a Fast Floating Point Processor (not shown) from SKY Computer (SKYFFP). It is a single board, double-width VME module which conforms to the IEEE single and double precision floating point standard. The SKYFFP is referenced by the CPU through a set of registers (not shown) and therefore is not a true co-processor. The SKYFFP performs the basic operations on single and double precision numbers and also some more complex operations (square-roots, trigonometric and transcendental) on single precision numbers. However, only the basic functions are used. Typical execution time for the basic functions is 4.5 $\mu$sec.

The system is essentially a ROM-based microcomputer system. All the system software (real-time operating system, I/O drivers, libraries, etc.) and all the application tasks (Kalman filter, data collection, navigation tasks, etc.) are burnt-in EPROM. This is the manner in which memory is partitioned. The CPU module (not shown) provides 128 Kbytes of EPROM containing all the system software and 32 Kbytes of RAM containing a vector table and the operating system data base. An MVME201 module provides additional 256 Kbytes of RAM of which 48 Kbytes are allocated to the system pool where task stacks and local variables are assigned, 16 Kbytes are defined as the user pool where additional local or sharable memory can be dynamically allocated to tasks, 64 Kbytes are used to download new system software in development and 128 Kbytes used to download new application software or diagnostics during development. An MVME211 module populated with 2764 or 27128 EPROM provides up to 256 Kbytes of permanent data storage for the application tasks and diagnostics. An MVME210 module (not shown) fully populated with non-volatile RAM provides 32 Kbytes permanent read/write memory of which 24 Kbytes are used to download new version of the operating system during development and 1 Kbyte is used as a permanent save area by the application tasks. All the MVME modules are built by Motorola.

All but one, the console interface, of the I/O modules are accessed via an I/O Channel 52. The I/O Channel is specifically designed to provide efficient, low-cost distributed communications to peripheral and I/O controller boards. The I/O Channel addressing space is protected and can be written to only in the supervisor state.

A Quad Serial Port Interface 54 contains four independent serial channels using either the RS-232C or the RS-422A standard. The baud-rate is switch-selectable for each channel and the data format is selected under software control. One channel is used for data logging, one to interface with the gyrocompass and two to interface with the satellite receiver. The ports are configured as follows.

A General Purpose Interface contains all the necessary logic to interface with a speed-log unit, a 20-key keypad, three LCD displays, a Magnavox receiver and provides 256 bytes of non-volatile RAM. The odometer outputs two pulse trains corresponding to the distance travelled. This module incorporates a 24-bit counter and the necessary latches to extract the direction of travelling. The keypad consists of an array of SPST switches arranged in 4 rows of 5 columns (as already mentioned). This module provides the necessary logic to scan and debounce the switches. The MX-1107 satellite receiver is operated through a 16-key keypad which produces a debounced, active low TTL output. This module incorporates the appropriate logic to properly emulate that keypad. The system incorporates a main LCD display and two remote LCD displays. The data is sent to all the displays through a common serial link consisting of four data and control lines. Each display has the necessary logic to demultiplex the data received and to control the LCD drivers. This module incorporates the logic to convert the data into serial form, generates a synchronising clock and the handshake signals.

An Analog Module filters out noise from some input signal lines. Though it plugs into the I/O Channel, all the data lines in and out are accessed through the front connector.

An Analog Input Module manufactured by Motorola (VMEmodule MVME600) provides a complete multi-channel, 12-bit, analog data acquisition. It is configured to provide 8 differential channels. One channel is used to read the baro-altimeter and two channels are used to read the magnetometer outputs.

A Dual Channel Serial Port, manufactured by Motorola (VMEmodule MVME400) provides two independent full RS-232C serial input/output ports and is used to connect to a host computer.

A breakout panel 56 is used to interconnect the various I/O modules and the sensors via a side panel.

The system operates on vehicle power, which is 28 Vdc. The system requires 5 Vdc and $\pm12$ Vdc for the computer, satellite receivers and sensors. The gyrocompass operates from the vehicle power directly. Two DC-to-DC power-supplies are used. One provides 5 Vdc at 36 Amp and the other $\pm12$ Vdc at 2 Amp.

SYSTEM SOFTWARE

The software system uses the VRTX operating system, a real-time operating system on a 4K PROM. VRTX is written as position independent code so it may be located anywhere in the user's address space. The VRTX executive provides an operating system kernel. In effect adding several high-level instructions which allow the user to create a multi-tasking real-time system. The VRTX system calls are grouped as follows:

multi-tasking management (Task creation/deletion/suspension/resumption/priority)
memory management (allocation/release and partition creation/deletion)
task communication (post/pend/accept and queued post/pend/accept)
interrupt management (post/qpost from interrupt)
clock support (get/set time, delay)
character I/O (get char/put char)

Device drivers, asynchronous processes which call and are called by the Operating System, receive and service interrupts from I/O device, initiate I/O operations when requested by the Operating System (from a user request), cancel in-progress I/O operations, and perform device specific functions on power-up, time-out, etc. Device drivers are required for RS232 serial lines, A/D converters, odometer counter, keypad, LCD, non-volatile ram and the keypad emulator.

A floating point processor (FPP) performs matrix arithmetic in a filter described later. VRTX was modified to initialize the FPP and to generate appropriate calls (to the FPP if present, to software floating point package if not).

The software was written in the "C" programming language. "C" is a general purpose programming language, originally written for the UNIX operating system, but now popular on many microcomputers. "C" provides the fundamental flow constructions required for well structured programs: statement grouping, decision making, looping with termination test at the top or at the bottom, and selection of one of a set of possible cases. It also provides the standard data types (char, short, int, float, double, etc) and the ability to define data sets (stuct, union). Most important, C provides pointers and the ability to do address arithmetic, a useful feature in most programs, especially microcomputers. Arguments to functions are passed by value, arrays are passed by reference. The major advantage of "C" is that it reflects the capabilities of current computers. Thus, "C" programs tend to be efficient enough that there is no compulsion to use assembly language instead. The major disadvantage is that there is no standard utility routine package defined (I/O, math, etc.) and each compiler uses slightly different names or argument lists.

APPLICATION TASKS

Figure 6:
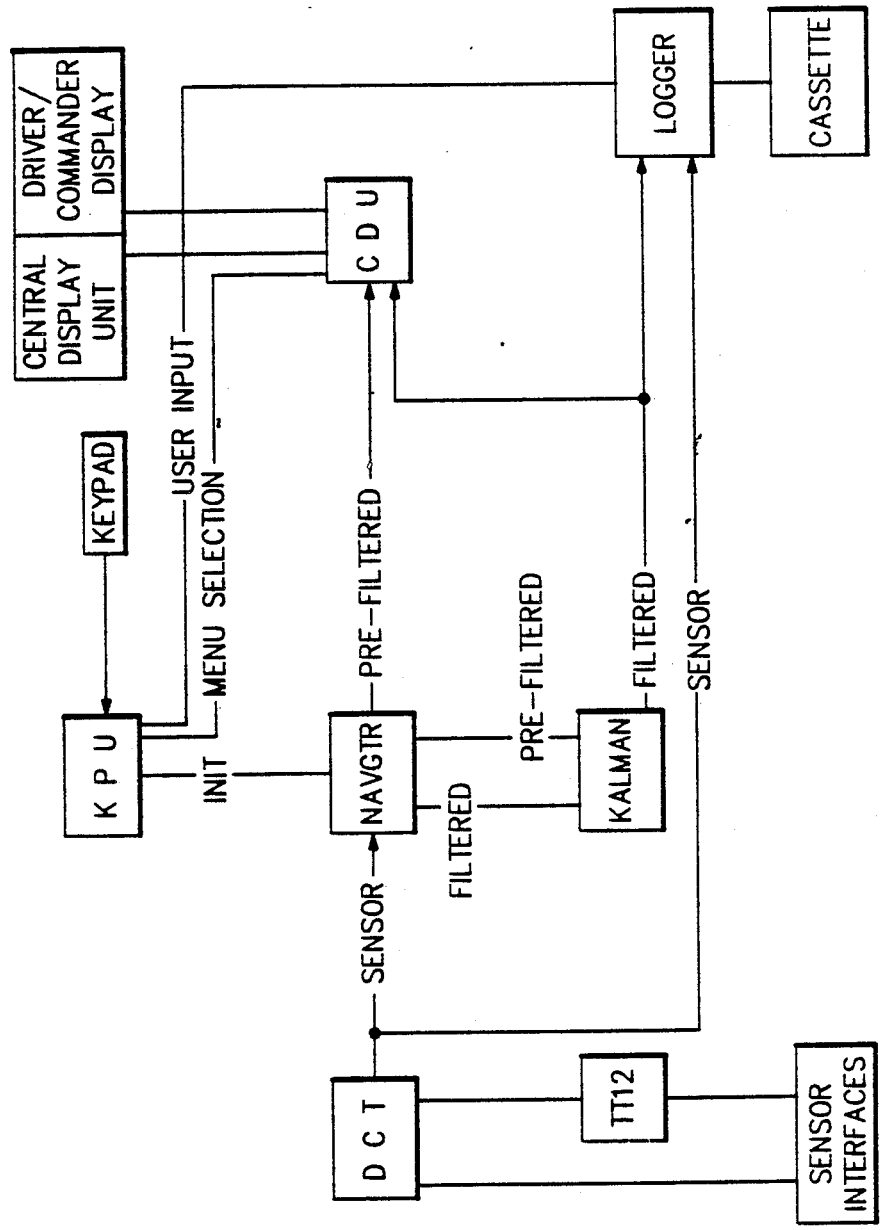
FIG. 6 is a block diagram schematically illustrating the structure and interrelationship of various software routines of the present invention.

An application task exists for each of the major functions in the system. FIG. 6 illustrates the overall software structure and shows the various tasks. The tasks and their functions are described below. Data Collection Task (DCT)

The primary purpose of the Data Collection Task (DCT) is to provide an interface between the device drivers (and thus the sensor interfaces) and the application tasks which require raw sensor data. This involves initializing the sensors and the collection of sensor data at specified rates (DR, flux, baro, GPS) or as it becomes available (Transit). As well, DCT feeds velocity and altitude to the transit receiver and monitors the system clock by checking it against the time at a transit fix.

Figure 7:
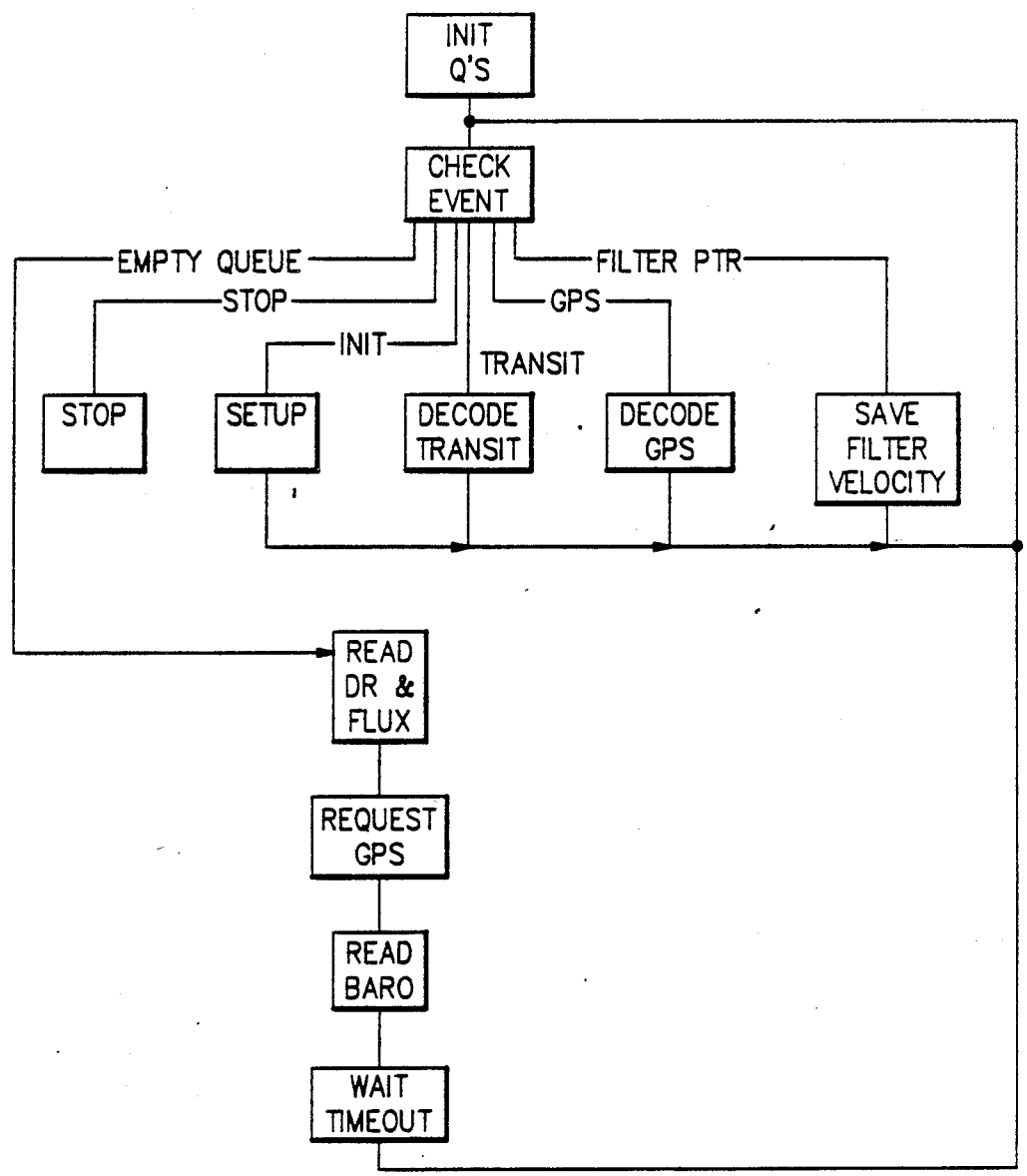
FIG. 7 is a block diagram schematically illustrating the structure of a Data Collection routine in accordance with the preferred embodiment of the invention.

DCT is essentially a time driven task. At periodic intervals, it wakes up, reads the various sensor interfaces, formats the sensor data using the appropriate data structure and sends the data to the other application tasks requiring the data. Reading sensor data is either through the device driver or, in the case of the transit data, through another task. After reading all the sensor data, DCT waits for the next wake-up. FIG. 7 illustrates the general work cycle of the DCT.

Serial Port Listener (TT12)

The VRTX executive does not provide a mechanism to perform a device driver read operation, continue program execution and check at some later time if the read has completed. This would be a useful feature, especially in the case of serial I/O, where the input might not come for a long time or the output might take a long time to do. In the present invention, transit data is received over a serial port but at undetermined aperiodic intervals. If the DCT reads the serial port, then it is locked on the device read until transit data is received (and no other sensors can be read). To overcome this difficulty, the serial port listener task (TT12) reads the serial port connected to the transit/GPS receiver. When a read completes, the ASCII data is sent to the DCT and another read is issued. In this way, the serial line is continuously monitored for transit data and the DCT is free to collect data from the various sensors at the required rates. FIG. 8 illustrates the general work cycle of the TT12 task.

The transit data is contained in two transmission blocks. The first block is sent automatically by the receiver. The second must be requested specifically. As well, both transit and GPS are received on the same serial port (GPS also requires two transmission blocks). TT12 requests these extra blocks in order to minimize delays in processing the data.

Navigation Task (NAVGTR)

The navigator task (NAVGTR) provides the display task with continuous up-to-date position, velocity and status information. To do this effectively, this means that NAVGTR must perform the pre-filtering and dead-reckoning functions. Pre-filtering involves continuity and reasonableness testing of the sensor data. Dead-reckoning involves integrating heading and speed from a time T0 to time T1 and knowing the position at time T0 to find the position at time T1. Doing these functions in a separate NAVGTR task rather than the filter task allows the system to provide the user with real-time information and also to perform Kalman filtering of sensor inputs in a background mode. As well, the NAVGTR provides gyro settling/alignment information to the user. For the Lear Seigler, the system performs multiple alignments and uses the average as the initial heading.

Figure 9:
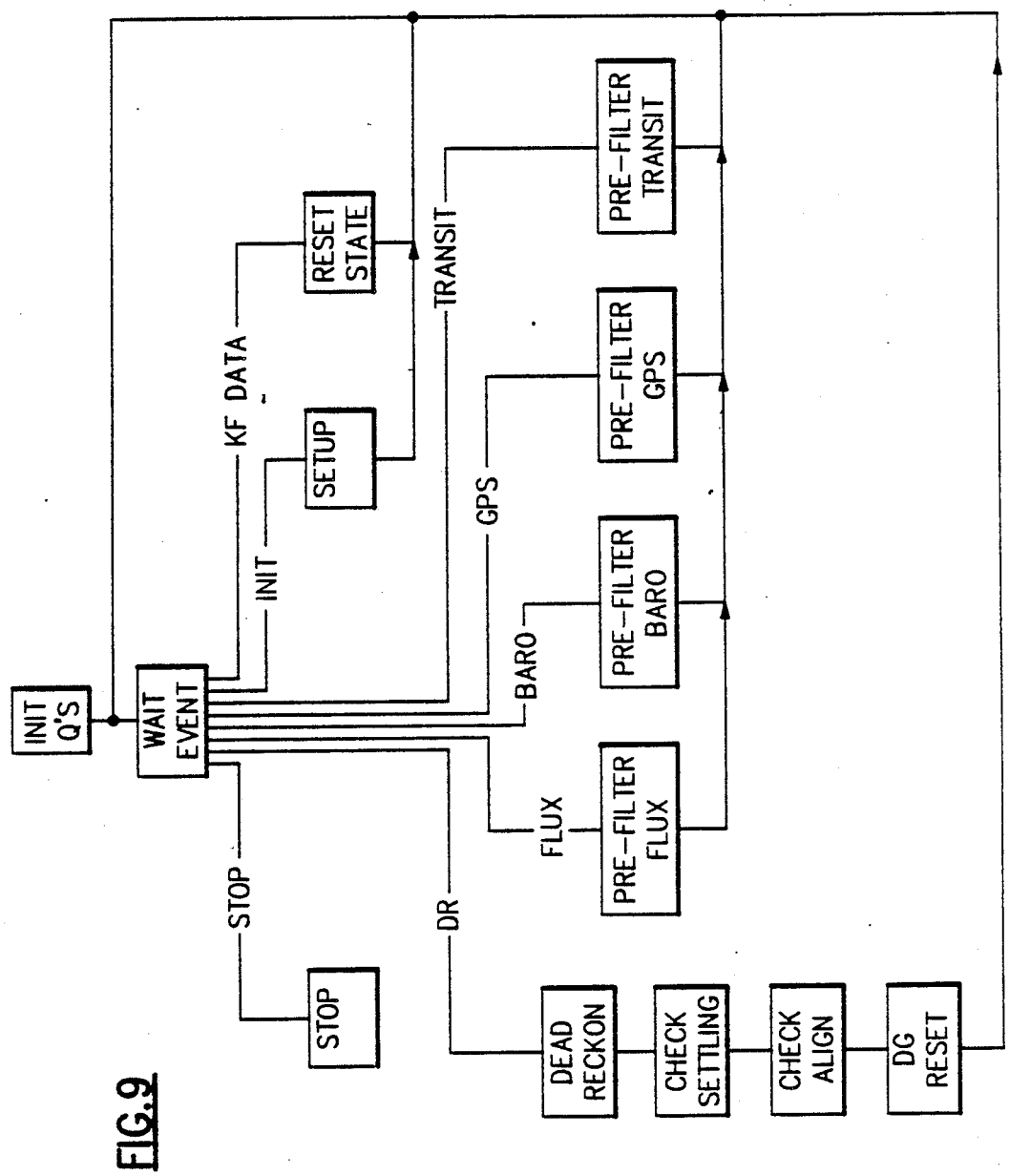
FIG. 9 is a block diagram schematically illustrating the structure of a Navigation routine in accordance with the preferred embodiment of the invention.

The NAVGTR task is data-driven in the sense that it performs its functions on the data as it receives the data. It does not request data and relies on other task providing the data at appropriate intervals (although all data is time-stamped as it is requested by DCT). As part of the pre-filtering process, it maintains statistics on sensor data errors. FIG. 9 illustrates the general work cycle of the NAVGTR task.

Kalman Task (KALMAN)

The purpose of the filter task (KALMAN) is to implement Kalman filter based sensor blending algorithms. A description of the analysis and design process by which this task was developed appears later. Some of the functions of this task are to propagate a covariance matrix and state vector from the last update to the current point in time, to form the filter measurements from the sensor data, to perform the residual tests on these measurements and to process the measurements using the Kalman update algorithm. This task also includes a prefilter, which preprocesses some of the measurements to apply corrections or suppress noise. For example, since the baro-altimeter could have a large bias error if used alone, an elevation map is used to bound this error. As well, the fluxgate can have a large error (since the magnetic north is not the north pole). Thus, a geo-magnetic field model is used to correct this error. Some prefilter averaging is also applied to the magnetic measurements.

Figure 10:
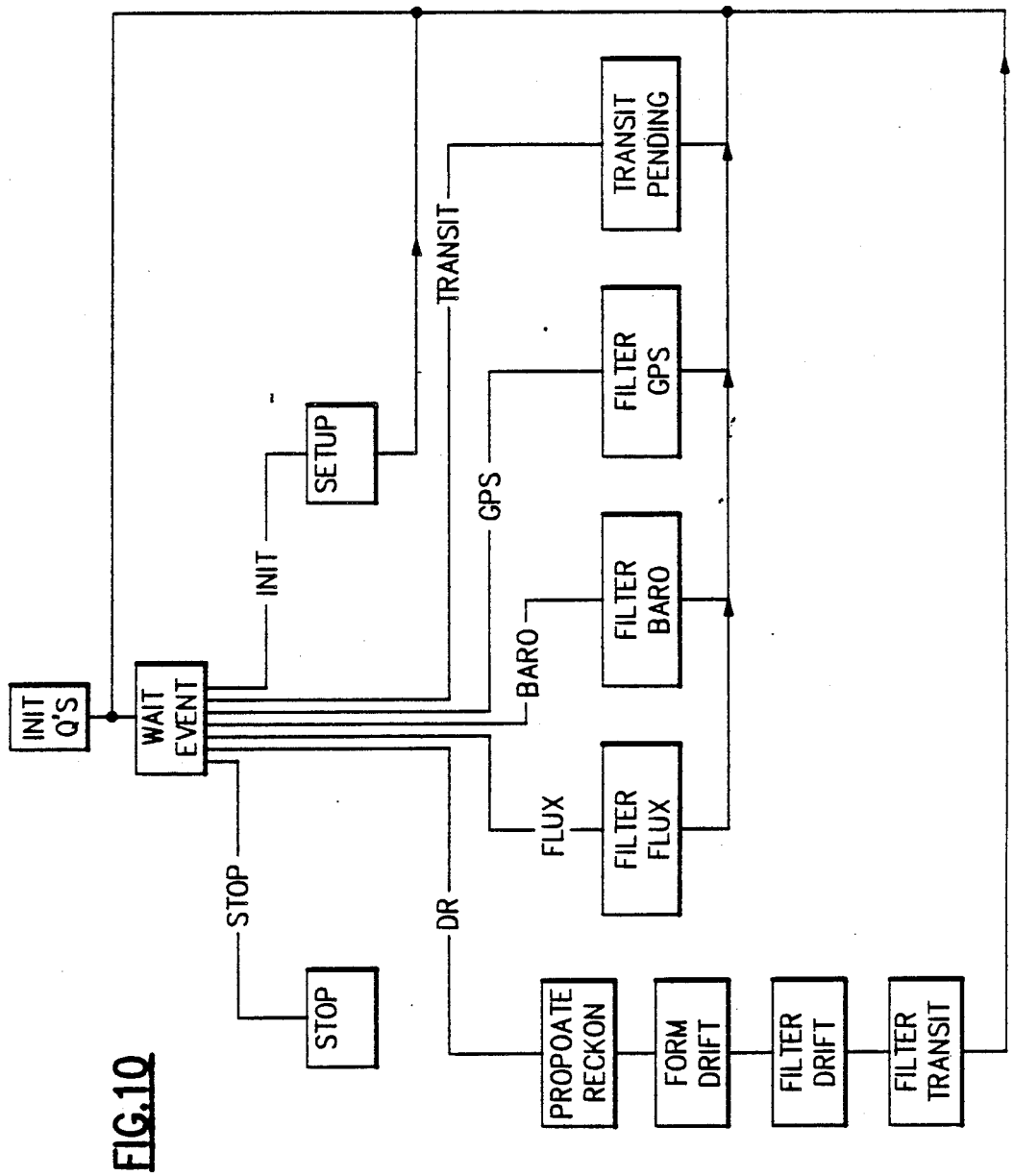
FIG. 10 is a block diagram schematically illustrating the structure of a Kalman Filter routine in accordance with the preferred embodiment of the invention.

The KALMAN task, like the NAVGTR task, is data driven. It processes the data as it is received and relies on other tasks to preform the timing functions. Since the NAVGTR task performs the dead-reckoning, it is not critical that the KALMAN task perform the filtering functions in less than the dead-reckoning time interval (although the smaller the delay, the better the real-time accuracy). FIG. 10 illustrates the general work cycle of the KALMAN task.

The Keypad Task (KPU)

The Keypad Task (KPU) allows the user to enter information to the system through the keypad. The system might need this information for system initialization or it might be a response to a prompt for one of the function keys. These keys allow the user to request waypoint functions (entry, display, activation, deactivation), display selection (sensor data, system data, comparison data or UTM information), help information (general help or specific to a prompt if pressed in response to the prompt) and miscellaneous functions (change gyro mode, transparent mode to the MX1107).

The primary objective of the KPU was that it should be user-friendly. To achieve this objective, several techniques were used. First, the system automatically enters the start-up sequence on power-up and function keys allows the user to select the area of interest. Prompts tell the user what input is required and default answers to the prompt show the response format and provide easy responses for most prompts. An on-line help function key gives a more detailed explanation of a prompt if pressed in response to the prompt (it gives general help if no response is requested). Finally, all user input is echoed to provide positive visual feedback of input. As well, rubout and clear keys allow corrections to be made quickly and easily.

Figure 11:
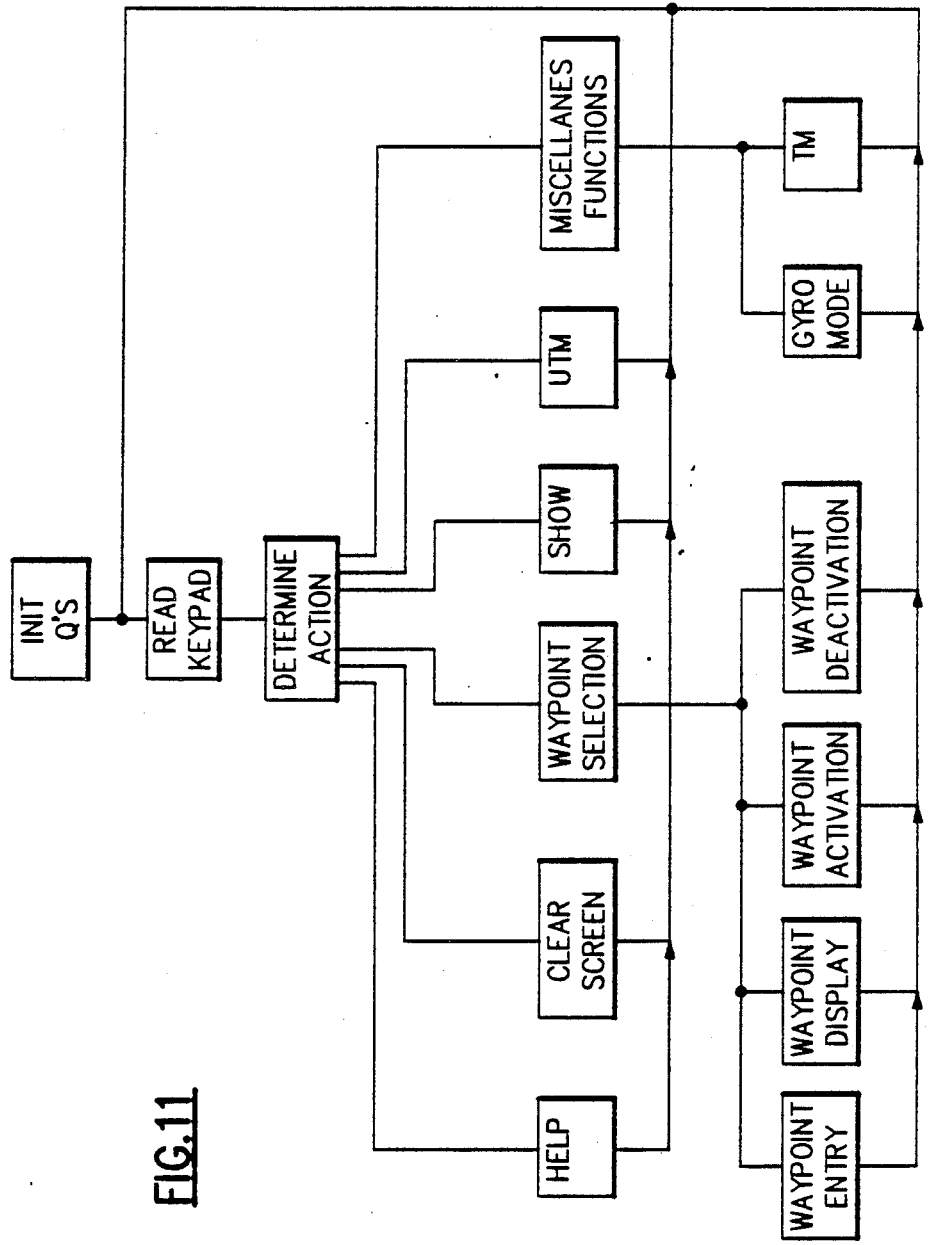
FIG. 11 is a block diagram schematically illustrating the structure of a Keypad routine in accordance with the preferred embodiment of the invention.

The KPU task accepts input from the user, either in response to a prompt or triggered by a function key. Once a function is initiated (through the function key), it leads the user (prompts) through all the steps necessary to implement the function. At that point, the information is given to the appropriate task for implementation and the KPU waits for the next user request. FIG. 11 illustrates the general work cycle of the KPU task.

Display Task (CDU)

The Display Task (CDU) formats all data shown on the central display unit and on the driver/commander displays. The formatting of the data involves selecting the information from the proper data structure, converting the data into the appropriate units and sending the data to the correct field of the display at the appropriate intervals. The driver/commander display is sent position, heading and desired heading on a continuous (every second) basis. The central display is sent time, position, heading, speed, status and desired heading on a continuous (every second) basis. As well, the bottom three lines of the central display are used to display information selected by the user. This might be sensor data, comparison data error states, filter states, waypoints or UTM information. The keypad task can allocate these three lines for itself (for Prompts) and the display cannot use then until they have been deallocated.

Figure 12:
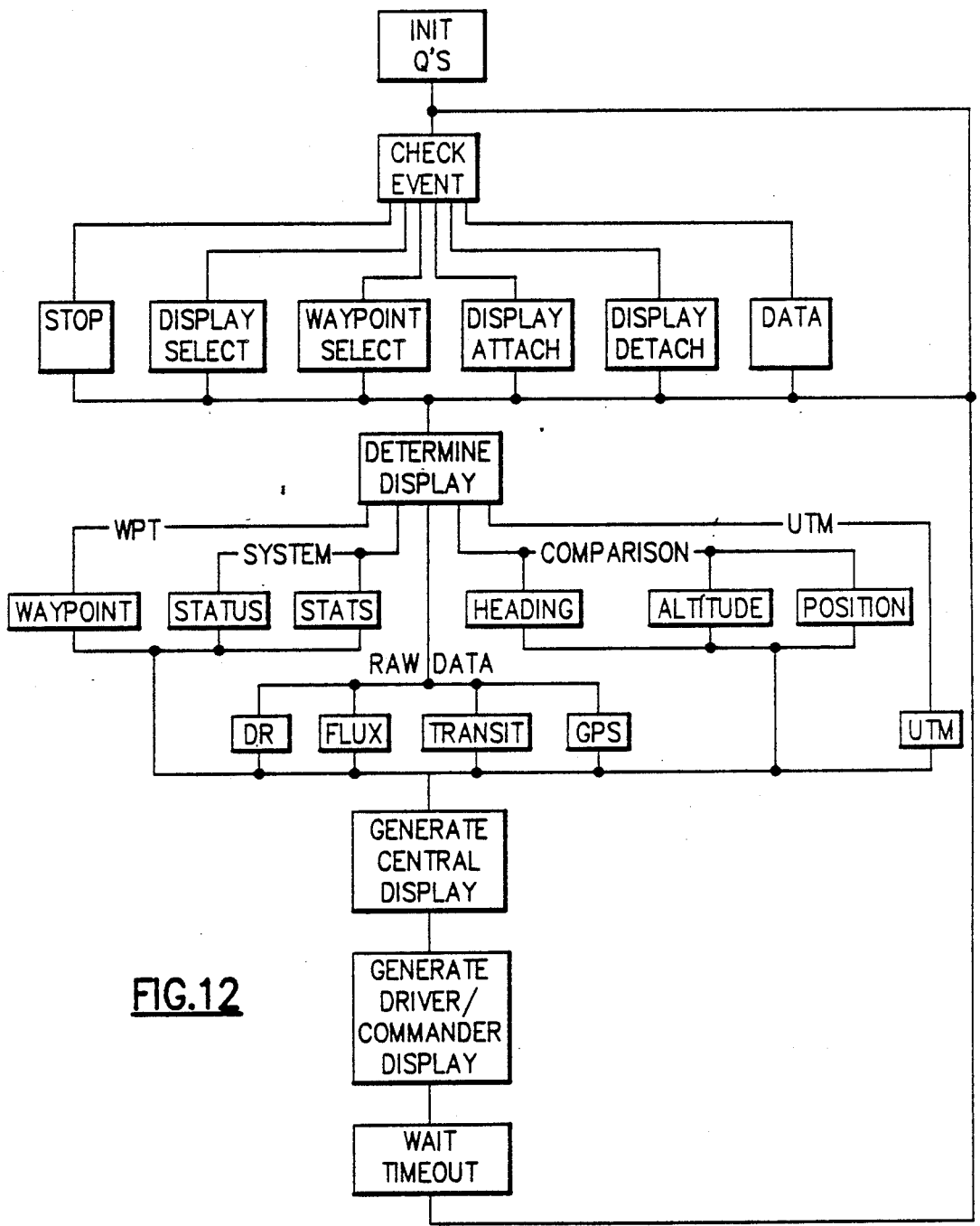
FIG. 12 is a block diagram schematically illustrating the structure of a Display routine in accordance with the preferred embodiment of the invention.

The CDU task is a time-driven periodic task in the sense that at specific times it wakes up, checks to see if new displays or waypoints have been selected and then displays the requested data. FIG. 12 illustrates the general work cycle of the CDU task.

Data Logger Task (LOGGER)

The Data Logger Task (LOGGER) is responsible for formatting binary data into a block suitable for transmission over a RS232 serial line. As well, the task requesting the data logging can specify that the data is to be time-stamped by the logger task.

The LOGGER task receives blocks of data for logging from various tasks. It treats these blocks as an array of bytes which are then split into most significant/least significant nibbles (a nibble is 4 bits). The nibbles are converted to the ASCII representation of a hexadecimal digit and this string of hex digits is transmitted over the serial line.

Inter-Task Communication

Inter-task communication generally fits into one of the following five categories:
Initialization data
  from the keypad task to the data collection task, navigator task and filter task
Operator data
  from the keypad task to the display task
Raw data
  from the data collection task to the navigator task
Pre-filtered data
  from the navigator task to the filter and display tasks
Processed data
  from the filter task to the display, navigator and data collector tasks All of the above data also goes to the data logger for recording on cassette (magtape/winchester/etc) to allow post-analysis.

ERROR MODELLING

In order to properly integrate the various sensors using a Kalman filter, all significant stochastic and deterministic errors must be carefully modelled. Deterministic errors, such as magnetic declination, are modelled so that their effects can be directly removed as much as possible, and the remaining errors are modelled as random processes to enable the Kalman filter to estimate them and to calculate the appropriate gain matrix to weight the various measurements. An overview of the modelling process is described hereinbelow. It will be noted that, to a large extent, this error modelling is generic, with the form of the models depending only on the type of sensors being used. The actual sensor models chosen will determine the numerical values of the parameters, enabling the software to be easily adapted to different qualities of sensors. This flexibility allows the cost/performance trade-off with regard to sensor selection.

The types of stochastic models used in the Kalman filter are limited for practical reasons to first order Markov processes and uncorrelated white noise.

DEAD RECKONING ERRORS

Dead reckoning (DR) is the determination of the position at time t1 by knowing the initial position at time t0 and integrating the velocity vector from t0 to t1. For land and sea navigation, the velocity vector is generally obtained by measuring the heading $\theta$, speed S and, if possible, pitch $\Phi$. The DR heading and pitch is measured using the VRU and the speed is measured using the vehicle odometer.

As mentioned earlier, a speed sensor installed on the odometer cable generates the pulses per revolution and is used to measure the along-track distance travelled by the vehicle. These pulses are fed directly to the computer which counts them over the integrating interval $\Delta t$. This pulse count C is then multiplied by the appropriate scale factor F, to obtain the distance D, moved over the ground during the time interval $\Delta t$. The vehicle's average speed over this interval is therefore $S = D/\Delta t = CF/\Delta t$.

The VRU heading measurement is assumed to be the clockwise angle $\theta$ from true north to the horizontal velocity vector. If the velocity vector is of length S, and is pitched out of the horizontal plane by the angle $\Phi$, then the north and east dead reckoning velocity components are:

$$V_n = \frac{CF \cos\Phi \cos\theta}{\Delta t} \quad (1)$$

$$V_e = \frac{CF \cos\Phi \sin\theta}{\Delta t}$$

The nominal value of the scale factor F is provided by the manufacturer, but to achieve the necessary accuracy, a more precise value can be determined by means of a simple calibration run. The dead reckoned position is then obtained by integrating these velocity components over the WGS 84 ellipsoid, as follows:

$$\lambda_{t+\Delta t} = \lambda_t + \frac{V_n \Delta t}{R_n + h} \quad (2)$$

$$L_{t+\Delta t} = L_t + \frac{V_e \Delta t}{(R_e + h)\cos\lambda}$$

where
h is the height of the vehicle above the WGS 84 ellipsoid; and
$R_n$ and $R_e$ are the meridional and prime radii of curvature of the ellipsoid:

$$R_n = \frac{A^2}{B(1 + E\cos^2\lambda)^{3/2}} \quad (3)$$

$$R_e = \frac{A^2}{B(1 + E\cos^2\lambda)^{\frac{1}{2}}}$$

where $$E = A^2/B^2 - 1 \quad (4)$$

and A and B are the semimajor and semiminor axes of the ellipsoid. There are many possible sources of error in this DR calculation, most of which can be categorised as speed or track errors. The important errors are expected to be as follows:

"Speed" errors: (5)
S1 - vehicle track slippage (along track)
S2 - odometer scale factor error
S3 - computer clock error
S4 - measured pitch error δΦ
S5 - odometer pickoff sensor fault
S6 - data communication fault
S7 - invalidation of odometer when vehicle is used in amphibious mode, or on drifting ice.
"Track" errors: (6)
t1 - gyro misalignment (not exactly along vehicle axis)
t2 - gyrocompassing error
t3 - directional gyro error
t4 - vehicle lateral track slippage (crabbing)
t5 - discretisation error (resolution)
t6 - data communication fault
t7 - invalidation of heading as track when in amphibious mode, or on drifting ice.

The most significant of these DR error sources are expected to be s1, s4, t1, t2 and t3. Although other errors such as s7 and t7 are potentially more serious, they are much less likely to occur.

The vehicle track slippage s1, during acceleration, deceleration and moving on a grade, is expected to produce approximately 1% error in distance travelled, which is converted to speed. Treated as a stochastic process, this error is continuous, bounded and nominally zero mean. Thus, it can be modelled to first order (which is quite adequate for this purpose) as a first order Markov process (FOMP).

Careful calibration on the host vehicle, to adjust the variable scale factor, can reduce the odometer scale factor error s2 to a comparably negligible level.

If the vehicle pitch angle Φ is not available, it would have to be approximated by zero in equation (1). In this case, the effect of pitch error s4, incurred by neglecting the non-horizontal component of the velocity, is a scale factor equal to (1−cos Φ). This is an error of less than 1% of distance travelled for pitch angles of less than 8°, which is a grade of about 1 to 7. At steeper grades this error increases fairly rapidly (about 4% error at 16° pitch for example). Stochastically this error is random, bounded, continuous and zero mean, corresponding to a FOMP just as s1.

The heading error consists mainly of the static error (t1+t2) plus the dynamic error, either t2 (if a dynamic gyrocompass is used) or t3 (if a directional gyro is used). The static error is largely due to the difficulty of accurately aligning the gyro sensitive axis to the vehicle's forward movement axis during installation. In practice, the gyro is mounted by aligning a mark on the gyro housing, representing the sensitive axis, to a mark on a mounting plate, representing the vehicle's forward axis. The difficulty in practice is accurately installing the mounting plate in each vehicle. By using a software heading offset, careful calibration of the host vehicle can reduce the effective misalignment to well below one degree.

The initial gyrocompass heading error t2 is expected to be below 1° (1σ) at low latitudes, but to increase with latitude as secλ. This error will be zero mean, continuous and bounded: again a FOMP (but not quite stationary since λ will change slowly).

In directional gyro mode, the heading error t3 will vary slowly in an unbounded manner. The drift rate however, will be bounded, continuous and nominally zero mean, so that the heading error rate can be modelled as a stationary FOMP. This drift rate will be unaffected by latitude.

MAGNETIC HEADING ERRORS

The magnetic flux valve measures the direction of maximum horizontal magnetic field strength. Since the earth's magnetic field is roughly aligned with its axis of rotation, on a global scale the north magnetic pole is close to the geographic north pole. Therefore, at low latitudes the magnetic direction is approximately north. Unfortunately, however, the north magnetic pole is almost centrally located in the Canadian arctic, so that the magnetic field direction differs substantially from true north throughout this area. The difference between true north and magnetic north is known as the Magnetic Variation or the Magnetic Declination.

To obtain a usable magnetic heading it is therefore necessary to apply a magnetic declination correction to the measurement. The geomagnetic field model selected is known as IGRF85 (International Geomagnetic Reference Field 1985), which is a global spherical harmonic model of degree and order 10 in the main field and 10 in the secular field. A Fortran program based on this model (available from the American National Oceanographic and Atmospheric Administration for example) computes the horizontal field strength, the dip angle, the total field strength and its three Cartesian components (from which the declination can be calculated) as well as the rate of change of each of these quantities. The dip angle and horizontal field strength are useful in predicting the accuracy of the magnetic flux valve measurement.

The error in magnetic heading is largely due to unpredictable temporal variations in the direction of the local magnetic field vector, but there can also be significant sensor errors, especially if a pendulous gimbal is used to keep the sensor horizontal. The most important factors affecting magnetic heading accuracy are as follows:

| | | |
|---|---|---|
| m1 - | local variations in the geomagnetic field (temporal and spatial); | (7) |
| m2 - | magnetic fields induced in the vehicle by the earth's field; | |
| m3 - | permanent fields in the vehicle; | |
| m4 - | sensor misalignment error; | |
| m5 - | dynamically induced deviations from the horizontal (gimballed systems) | |
| m6 - | low horizontal field strength; | |

The uncompensated magnetic heading error can then be expressed as:

$$\theta - \theta_m = m1(\lambda, L, t) + m2(\theta) + m3(\theta_m) + m4 + m5(t) \tag{8}$$

where $\theta$ is the geographic heading and $\theta_m$ is the measured magnetic heading.

The most obvious source of error in magnetic heading is due to the fact that the magnetic field vector does not generally point towards the geographic north. As described above, the large scale spatial component of m1 can be modelled fairly well. On a local scale the magnetic field is affected by permanent or induced magnetic fields in the vehicle itself or some nearby structure (manmade or geological). The permanent field of the vehicle, m3, will add vectorially to the earth's magnetic field vector, introducing a heading error that varies sinusoidally as a function of the vehicle's geographic heading, with a period of 360°. This is often called the "hard-iron effect", and is due to magnetised portions of the vehicle or its load. If the load effect can be neglected then this error can be compensated for by knowing its amplitude and phase. The induced field, m2, known as the "soft-iron effect", is due to the high permeability portions of the vehicle (such as iron and steel) warping the earth's magnetic field. This error is similar to m3 in that it can be compensated for by determining it's amplitude and phase, but different in that it is a function of magnetic heading and that m2 has a period of 180°. If we let $G(\lambda, L, t)$ be the magnetic declination predicted by the geomagnetic field model, (a function of latitude longitude and time) then equation (8) can be written as:

$$\theta - \theta_m \approx G(\lambda, L, t) + \Delta m1(t) + a_2 \sin(2\theta_m + \delta_2) + a_3 \sin(\theta + \delta_3) + m4 + m5(t) \tag{9}$$

where $\Delta m1(t)$ is the error of the field model, a2, a3, $\delta_2$ and $\delta_3$ are constants associated with the vehicle's permanent and induced field and m4 is the sensor misalignment. These constants can all be found by a fairly simple calibration procedure. After the geomagnetic and vehicle field models have been applied, the remaining magnetic heading error is:

$$\theta - \theta_m = \Delta m1(t) + m5(t) \tag{10}$$

where field uncertainty $\Delta m1(t)$ will be randomly varying in a continuous manner, much like a first order Markov process, and the dynamically induced error m5 will be largely uncorrelated, and can be treated as white noise.

Although a good geomagnetic field model can correct for the spatially varying component of m1, there will remain a significant time varying component, especially in the vicinity of the magnetic poles. This temporal fluctuation in the field is the most serious problem in obtaining an accurate magnetic heading, especially if it is magnified by the geometric effect near the poles where the field has a large vertical component and a small horizontal component. This near vertical alignment makes it very difficult, if not impossible, for a flux valve to obtain any heading measurement at all. This is primarily because the change in the magnetic declination $\theta$, and hence in magnetic heading $\theta_m$, as a function of temporal changes in the north and east components of the magnetic field $\delta X$ and $\delta Y$, is inversely proportional to the horizontal field strength H:

$$\delta\theta = \frac{-\sin\theta \, \delta X + \cos\theta \, \delta Y}{H} \tag{11}$$

where $\delta\theta$ is the change in the magnetic declination, in radians. Equation (11) is a purely geometric relationship, found by differentiating the definition $\theta = \arctan(X/Y)$.

These horizontal magnetic field components X and Y can exhibit substantial temporal variation, especially in the far north. Although these variations are random, their expected magnitude does vary in a fairly regular fashion with time of day and with season. There is also a correlation with the 11-year solar cycle and the 27-day period of the sun's rotation. The mean hourly variation of these field components for an area around the north magnetic pole, over a large portion of the Canadian arctic, is typically on the order of 100 Gammas, but the actual variation can at times easily be as much as 500γ. The horizontal field strength H is generally less than 17,000γ in the Canadian Arctic, resulting in declination changes of more than 3°, and in some areas more than 10°.

Another source of magnetic heading error m5 is also strongly effected by the horizontal field strength. This is due in part to the problem of keeping the flux valve vertically aligned. Any small misalignment will cause the strong vertical component of the field to project into the flux valve's sensitive (nominally horizontal) plane and introduce a large unpredicatable error. This error may be described as a function of an acceleration that is assumed to have caused the pendulous gimbal to tilt. For small accelerations, the resulting heading error may be approximated by an expression equivalent to:

$$m5 = \frac{A \, Z \sin \beta}{g \, H} \tag{12}$$

where Z and H are the vertical and horizontal components of the geomagnetic field, A is the small acceleration, g is the gravitational acceleration and $\beta$ is the angle between the acceleration vector and north. This is clearly sensitive to small horizontal field strength.

These dynamically induced errors may be examined in more detail as a function of gimbal pitch and roll angles $\Phi$ and $\psi$, and magnetic field components X, Y, and Z (north, east and down). The exact expression is rather long, but for a small pitch angle $\Phi$ and zero roll, the heading error is approximately:

$$m5 = \tan^{-1}\left[\frac{\Phi Z (X\sin\theta + Y\cos\theta)}{H^2 - \Phi Z (X\cos\theta - Y\sin\theta)}\right] \quad (13)$$

As would be expected, the argument of this expression has singularities at pitch angles which place the magnetic field vector perpendicular to the gimbal plane (the sensitive plane of the sensor) which is nominally horizontal. In the Ottawa area for example, this singularity occurs at a pitch angle $\Phi$ of only 18.4° when the heading $\theta$ is zero. In other words, a gimbal pitch angle of only 18.4° or more would completely destroy the magnetic heading measurement accuracy.

It has been observed with a gimballed magnetic flux valve that these dynamically induced heading errors are indeed quite serious during normal operation of the host vehicle, even over rather smooth roads. At a one Hz sampling rate, this can produce a heading error of several degrees that appeared largely uncorrelated in time. The effect of this uncorrelated noise can be significantly reduced by implementing a simple prefilter.

VERTICAL ERRORS

The vertical DR position can be defined as the barometric altitude. The pressure-height relationship in the low altitude region (0 to 11 km), can be easily derived from the standard atmosphere equations as follows:

$$P = P_0(T/T_0)^{-g/aR} \quad (14)$$

$$T = T_0 + aY \quad (15)$$

where P is the measured air pressure, $P_0$ is the nominal sea level air pressure in the same units, T is the temperature, $T_0$ is the defined sea level temperature of the standard atmosphere (15.16° C.), "a" is the standard atmosphere temperature gradient for altitudes less than 11,000 m (about $-0.0065°$ C./m), "g" is the gravitational constant (9.80665 m/s/s), R is the gas constant (288 joules/(kg. °C.)) and Y is the vehicle height above sea level, in metres. Substituting (15) into (14) gives:

$$P = P_0(1 + aY/T_0)^{-g/aR} \quad (16)$$

or $$P = P_0(1 + AY)^B \quad (17)$$

where A and B are known constants with approximate values:

$$A = a/T_0 = -2.2569 \times 10^{-5} \text{ meters}^{-1} \quad (18)$$

$$B = -g/(aR) = 5.2386$$

To obtain the barometric height Y from the measured pressure P, equation (17) must be inverted to yield:

$$Y = \frac{e^{\frac{\ln(P/P_0)}{B}} - 1}{A} \quad (19)$$

This barometric altitude is augmented by using memory-efficient symbolic storage technique. To create this map, height above sea level was manually read directly from the 1:1,000,000 scale topographic maps. In this way, an "average" height was visually estimated for the corners of each grid square, which are one degree in longitude by one half degree in latitude. This digital map covers the region north of 60° latitude and between longitudes 60° west and 140° west. Two dimensional linear interpolation is then used to calculate the correct height estimate for any location between these data points. This produces a height function that is continuous and that corresponds to the stored values on the grid corners.

$$\begin{array}{l}\text{v1 - inaccuracy of the pressure-height equation, due to} \\ \quad \text{weather;} \\ \text{v2 - pressure transducer error;} \\ \text{v3 - data communication fault;} \\ \text{v4 - inaccuracy of the digital elevation map;}\end{array} \quad (20)$$

The vertical error v1 requires some explanation. The pressure-height relationship given by equation (19) describes an idealised "standard atmosphere", whereas in reality changes in weather are constantly changing the air pressure. In the Canadian Arctic, normal pressure fluctuations are 0.1 to 0.2 kiloPascals over a 12 hour period, and 2.5 to 5 kPa over a half week period. This would result in a false barometric height fluctuation of 8 to 10 meters over 12 hours and 200 to 400 meters over a half week. It is possible however for extreme weather to create pressure changes of 1 kPa per hour and 10 kPa per day or, equivalently, 80 meters per hour and 800 meters per day. This error is continuous, bounded and zero mean, and is modelled as a FOMP.

The pressure transducer error v2 is claimed to be less than ±0.11% FS (full scale), and if it is calibrated, less than ±0.02% full scale plus ±0.03% FS/°C. This amounts to an uncalibrated error of less than 15 meters in barometric height, which is very small compared with v1, so the calibration is deemed unnecessary.

V3 is intended to include any A/D conversion error, round off error, and any computational errors in evaluating equation (19).

Since the host vehicle is presumably restricted to the earth's surface, its height above the ellipsoid is in principle a well defined function of latitude and longitude. If a sufficiently detailed elevation map could be stored in the computer's memory, then the barometer would be unnecessary and the height error V4 would not be very significant. In order for the height information to be coded and stored in an efficient manner it was necessary to quantize the heights. This vertical quantization is 50 meters for heights up to 1km, and 100 meters for greater heights. When the map is read as a function of position the heights from the surrounding four grid squares are linearly interpolated, producing a continuous function of position. The largest error in reading this map is due to the local deviation of the true height from the "area averaged" height, as visually estimated from the topographical charts. In other words, the limiting factor is the spatial resolution used to read the charts (about 60 km by 60 km) and the resolution of the charts themselves. It is estimated that the map height error is on the order of 30 meters plus 10% of map height. This error is continuous, zero mean and bounded, and again modelled as a FOMP.

TRANSIT ERRORS

Since the DR position error will generally increase without bound, an independent position fixing system is required to periodically reset the DR position. Because of its accuracy and coverage, Transit was initially chosen to provide these position fixes. Transit is a satellite based navigation system, which was originally developed for the U.S. Navy Polaris submarine fleet by the Applied Physics Lab of John Hopkins University. The system has been operational since 1964, and was released for public use in 1967.

The Transit Satellite positioning system basically consists of 5 or 6 satellites in low circular polar orbits, transmitting continuously at two very stable frequencies. An earthbound receiver can obtain a position fix whenever a satellite passes overhead, by measuring the Doppler frequency shifts due to the relative motion. The transmitted signals are modulated with a data message containing timing marks and parameters describing the satellites orbit with enough precision to allow the receiver to accurately calculate the absolute position and velocity of the satellite. From this known satellite position and velocity profile and the Doppler derived relative velocity, the receiver can calculate its own position. However the receiver must either be stationary during the satellite pass, as is the case with survey instruments, or the receiver motion (velocity) relative to the earth during the pass must be known (to remove the effect of this velocity on the Doppler measurement). The receiver therefore must be continuously given its velocity. Any error in this velocity input will lead to an error in the position fix that the receiver produces.

Besides requiring velocity inputs, another inconvenient aspect of the Transit system is the waiting time between position fixes. This waiting time can be as short as 15 minutes or as long as 7 hours. Since the Transit satellites are in polar orbits, the mean time between fixes is shorter near the poles than at lower latitudes. In the Canadian arctic (latitude greater than 60°), Transit fixes should occur on average about once every 30 to 50 minutes. This is not exact because the Transit satellite constellation geometry (orbital spacing etc.) is not kept strictly constant.

The accuracy of a Transit position fix is highly variable, depending on many factors, as is briefly explained here. There are two basic types of Transit position errors: Static and Dynamic. The dynamic errors are caused by errors in the velocity and height information that is fed into the Transit receiver by the user, and as such can be considered to be system errors rather than just Transit errors. These dynamic errors are very important for system performance since there is no limit to their size, unless a limit can be placed on the size of the velocity and height errors. Fortunately, it is possible to determine the exact relationship between velocity/height input errors and the resulting latitude/longitude output errors, the details and usefulness of which are described below.

The static errors are errors which will occur even if the receiver is stationary. These are fairly small but practically unavoidable, and are also described below.

STATIC ERRORS

There are various sources of static error that are not sufficiently deterministic to completely predict and compensate for. These are:
Ionospheric Refraction
Tropospheric Refraction
Gravitational Field Irregularities
Drag and Radiation Pressure
Clock Error
Oscillator Phase Jitter
Ephemeris Rounding Error
Irregularities in the Earth's Motion Ionospheric refraction introduces an unwanted increase in phase velocity. This results in a position error of about 90 meters in single channel receivers. Fortunately, this can be largely compensated for in dual channel receivers by using the two broadcast frequencies (150 MHz and 400 MHz). Since the ionospheric wavelength stretch varies roughly quadratically with the broadcast wavelength, whereas the Doppler shift is linear with frequency, these effects can be separated. The remaining refraction induced error, after compensation, is typically 1 to 5 meters.

Tropospheric refraction also introduces errors, but these are directly proportional to the frequency and, thus, cannot be eliminated in this way. As with many other Transit errors, the expected size of this error depends strongly on the maximum elevation angle of the satellite, (the angle from the horizon to the satellite, as seen at the receiver position) during the satellite pass. This expected tropospheric refraction error is a function of maximum elevation angle, and is only significant (greater than 15 m) when this angle is less than 10°.

Further Transit position errors result from errors in the geopotential (gravity) model, and the surface force model (drag, radiation pressure) used to generate the satellite orbit. These position errors are each on the order of 10 to 30 meters.

There are other less significant but nevertheless identifiable static Transit errors, such as satellite clock error, oscillator jitter, ephemeris rounding error and unmodelled polar motion. These are all in the 1 to 5 meter range, hence not significant in the present application.

In summary, the total static error of the Transit position fixes will be uncorrelated in time, and therefore modelled as white measurement noise. The expected magnitude will depend upon the satellite elevation angle and whether the receiver is single or dual channel. For moderate elevation angles (10° to 70°), the dual channel fixes will have rms position errors of about 50 meters, and single channel fixes will have errors of about 100 meters.

DYNAMIC ERRORS

The relationship between the velocity error input and the position error output is expressed in the form of a sensitivity matrix h, where:

$$\begin{vmatrix} \text{north position error} \\ \text{east position error} \end{vmatrix} = \begin{vmatrix} h11 & h12 \\ h21 & h22 \end{vmatrix} \cdot \begin{vmatrix} \text{north velocity error} \\ \text{east velocity error} \end{vmatrix} \quad (21)$$

The components of this sensitivity matrix h are complicated functions of the satellite maximum elevation angle, the satellite direction of travel (north to south or vice versa), the receiver latitude, and whether the satellite subpoint is east or west of the receiver at maximum elevation. These are not easily expressed in closed form, but an algorithm to evaluate them has been implemented in the processor. These position errors may be as functions of satellite elevation angle, for a particular receiver latitude and satellite direction of travel. From this we can see that the commonly published relationships are not valid at high latitudes.

The important fact to be drawn from equation (21) is that it is deterministic and linear in the velocity error.

Therefore, if there is more uncertainty in the velocity than in the position, equation (21) can be inverted to solve for the velocity error. The Kalman filter effectively does this automatically thereby limiting the velocity uncertainty which otherwise would be unlimited because of the heading error in directional gyro mode, especially near the magnetic pole.

An error in the height supplied to the receiver also produces a Transit position error that can be defined as a function of the same parameters used in the H matrix above. The north and east position error dN and dE (true position−Transit position), due to a height error dH (true height−height estimate), can be expressed as:

$$\begin{vmatrix} dN \\ dE \end{vmatrix} = \begin{vmatrix} \cos(\psi)\tan(\sigma) \\ \sin(\psi)\tan(\sigma) \end{vmatrix} \begin{vmatrix} dH \end{vmatrix} \quad (22)$$

where $\sigma$ is the satellite maximum elevation angle, which the receiver supplies, and $\psi$ is the bearing from the receiver to the satellite subpoint (at closest approach) which can be computed from $\sigma$, the direction of travel, and the receiver position.

It is important to notice that, like equation (21), equation (22) is also deterministic and is linear in the height error. The errors described by equations (21) and (22) are in fact independent of each other and of the static errors. These errors are all additive, so that the total Transit position fix error can be expressed as:

$$\begin{vmatrix} dN \\ dE \end{vmatrix} = \begin{vmatrix} (\cos(\psi)\tan(\sigma)) & h11 & h12 \\ \sin(\psi)\tan(\sigma) & h21 & h22 \end{vmatrix} \begin{vmatrix} dH \\ dVn \\ dVe \end{vmatrix} + \begin{vmatrix} s1 \\ s2 \end{vmatrix} \quad (23)$$

where dVn and dVe are the velocity error components and s1 and s2 are the static position error components.

GPS ERRORS

The Global Positioning System (GPS) is a satellite based navigation system which has not been fully implemented. It should be fully operational by about 1990. It is presently scheduled to consist of 18 satellites with 3 hot spares, in 6 orbits at a height of 20,200 km., with orbital inclination of 55° and period of 12 hours. There will also be a ground control segment and two basic types of receiver equipment, precise or "P-code" receivers for military use, and course acquisition or "C/A-code" receivers for civilian or low cost applications. Each satellite will continually broadcast coded messages at two frequencies (1,227.6 MHz and 1,575.4 MHz). The P-code receivers will be able to decode both messages, whereas the C/A-code receivers will only be able to decode one. This system is designed to provide highly accurate 3 dimensional position, 3 dimensional velocity, and time measurements, continuously, on a worldwide basis, with high dynamic capability. The P-code accuracy will be about 15 meters in position (SEP), 0.1 meters/second in velocity and 0.1 microsecond in time.

The existing satellite constellation presently provides about 5 to 6 hours of coverage per day in the Ottawa area, in two segments 12 hours apart. This varies with receiver location, and will be altered (expanded) as more satellites are launched and their orbits adjusted. Even these two short periods provide the system with a significant improvement by bounding the accumulated position and velocity error and by calibrating the drift rates.

The GPS errors are quite small compared to the other sensor errors, and are largely uncorrelated. Therefore, it is not necessary to provide a detailed stochastic model for these errors. They can be simply treated as additive white noise.

KALMAN FILTER

It is primarily the errors of the dead reckoning system that the Kalman filter estimates. That is, the north and east position error (in meters), the VRU heading error (in radians), the vehicle odometer scale factor error (dimensionless) and the baro-altimeter height error (meters). In directional gyro mode, the gyro drift rate is also modelled. The Kalman filter also estimates the correlated errors of the aiding sensors, such as the magnetic flux valve heading error (radians) and the error of the digital map height (meters).

The filter estimates these errors by processing all of the available measurements using suitable stochastic and deterministic error models. Gelb, A., Editor, The Analytic Sciences Corporation, "Applied Optimal Estimation", Cambridge, Mass., The M.I.T. Press, 1974 describes the standard stochastic model types and provides an elementary introduction to Kalman filtering techniques.

STATE VECTOR

The filter in the present invention employs an eight dimensional state space. The eight states are defined as follows:

$$\begin{vmatrix} X1 \\ X2 \\ X3 \\ X4 \\ X5 \\ X6 \\ X7 \\ X8 \end{vmatrix} = \begin{vmatrix} \text{true height above geoid } - \text{ map height} \\ \text{true height above geoid } - \text{ baroaltimeter height} \\ \text{true heading } - \text{ magnetic heading} \\ \text{gyro drift rate in directional gyro mode} \\ \text{true heading } - \text{ gyro heading} \\ \text{(true speed } - \text{ odometer speed)/odometer speed} \\ \text{(true latitude } - DR \text{ latitude) in meters} \\ \text{(true longitude } - DR \text{ longitude) in meters} \end{vmatrix} \quad (24)$$

These states represent the Markov or time correlated portions of the errors. The uncorrelated component of the sensor errors are treated as measurement noise. Also there are actually two state vectors involved, because state X4 is deleted when in gyrocompass mode.

TRANSITION MATRIX

DR position error is simply the integral of the DR velocity error. This fact, together with the assumed stochastic error models for the DR velocity errors and the remaining state vector components, is used to propagate the state vector in time, according to the vector differential equation:

$$X(t) = F(t)X(t) + W(t) \quad (25)$$

This is used to propagate X between measurements. To implement this on a digital computer, equation (25) is converted to a discrete difference equation and linearized, to obtain the STATE TRANSITION matrix $\Phi$, where:

$$X(t + \Delta t) = \Phi X(t) + W(dt) \quad (26)$$

The result is:

$$\begin{vmatrix} X1 \\ X2 \\ X3 \\ X4 \\ X5 \\ X6 \\ X7 \\ X8 \end{vmatrix}_{t+\Delta t} = \begin{vmatrix} e^{-\Delta t/T1} & & & & & & & \\ & e^{-\Delta t/T2} & & & & & & \\ & & e^{-\Delta t/T3} & & & & & \\ & & & \boxed{} & & & & \\ & & & & & e^{-\Delta t/T6} & & \\ & & & & & & & \\ & & & & \Phi_{7,5} & \Phi_{7,6} & 1 & 0 \\ & & & & \Phi_{8,5} & \Phi_{8,6} & 1 & 0 \end{vmatrix} \begin{vmatrix} X1 \\ X2 \\ X3 \\ X4 \\ X5 \\ X6 \\ X7 \\ X8 \end{vmatrix}_t + \begin{vmatrix} W1 \\ W2 \\ W3 \\ W4 \\ W5 \\ W6 \\ 0 \\ 0 \end{vmatrix} \quad (27)$$

where:
$$\Phi_{7,5} = -\Delta t \, S \sin(\theta + X5/2) \quad (28)$$
$$\Phi_{7,6} = \Delta t \, S \cos(\theta + X5)$$
$$\Phi_{8,5} = \Delta t \, S \cos(\theta + X5/2)$$
$$\Phi_{8,6} = \Delta t \, S \sin(\theta + X5)$$

where $\Delta t$ is the propagation time interval, S is the deadreckoning speed, $\theta$ is the deadreckoning heading, and the submatrix $$\boxed{} = \begin{vmatrix} e^{-\Delta t/T4} & 0 \\ T4(1 - e^{-\Delta t/T4}) & 1 \\ 0 & 0 \\ 0 & e^{-\Delta t/T5} \end{vmatrix} \begin{matrix} \text{in directional} \\ \text{gyro mode} \\ \\ \text{in gyrocompass} \\ \text{mode} \end{matrix} \quad (29)$$

where:

T1 = map height error correlation time; (30)
T2 = baroaltimeter height error correlation time;
T3 = magnetic declination error correlation time;
T4 = gyro drift rate correlation time;
T5 = gyro Markov error correlation time;
T6 = odometer speed factor error correlation time;

and $Wi$ = driving white noise with covariance $Qi$ (31)
(for $i$ = 1 to 6)

where:

$$Q_i = M_i(1 - e^{-2\Delta t/Ti}) \quad (32)$$

where the Mi are the Markov process steady state root mean squared values:

| | |
|---|---|
| M1 = map height error covariance; | (33) |
| M2 = baroaltimeter height error covariance; | |
| M3 = magnetic declination error covariance; | |
| M4 = gyro drift rate covariance; | |
| M5 = gyro heading error covariance; | |
| M6 = speed factor error covariance | |

It will be noted from equations (27) and (28) that the state transition equation has not been completely linearized in X, and consequently the transition matrix $\Phi$ still exhibits a weak dependence on the state vector X. Therefore, this design uses an extended Kalman filter rather than a simple linear one. This is necessary because of the potentially large deadreckoning heading error, X5, that could occur in directional gyro mode, and the fact that the DR position error, (X7, X8), varies nonlinearly with this heading error. In fact, the linearization is only necessary to propagate the covariance matrix. The state vector components, and in particular X7 and X8, are propagated in a nonlinear manner, and at a higher rate than the covariance.

This nonlinearity in heading and potentially large heading error also led to a closed loop filter design whereby the filtered estimate of velocity and height are fed into the Transit receiver. Periodic resetting of the VRU heading with the filter heading keeps the VRU error X5 bounded. This is important primarily for the purpose of using DR as a backup under certain failure conditions.

MEASUREMENT VECTOR

The odometer "speed" and gyro heading are measured at a 1 Hz rate for dead reckoning, and the digital map is read once a minute to obtain the height. The filter measures the baroaltimeter and the magnetic flux valve once a minute to update its estimate of the state vector X (especially X1 X2 and X3). Transit position fixes are processed whenever they occur to update the filter estimate of X (especially X7 and X8 but also X5 and X6). Whenever the vehicle is in directional gyro mode and is not moving, the gyro drift rate is measured from successive heading measurements, to allow the filter to update the estimate of X4. The GPS position, velocity and height are measured at a 30 second rate, when they are available. The Kalman filter's measurement vector is therefore defined as:

$$\begin{vmatrix} Z1 \\ Z2 \\ Z3 \\ Z4 \\ Z5 \\ Z6 \\ Z7 \\ Z8 \\ Z9 \\ Z10 \end{vmatrix} = \begin{vmatrix} \text{map height} - \text{barometric height} \\ \text{map height} - GPS \text{ height} \\ \text{magnetic heading} - \text{gyro heading} \\ (\text{gyro heading} (t + \Delta t) - \text{gyro heading} (t))/\Delta t \\ \text{Transit latitude} - DR \text{ latitude (in meters)} \\ \text{Transit longitude} - DR \text{ longitude (in meters)} \\ GPS \text{ latitude} - DR \text{ latitude (in meters)} \\ GPS \text{ longitude} - DR \text{ longitude (in meters)} \\ GPS \text{ north velocity} - DR \text{ north velocity (m/sec)} \\ GPS \text{ east velocity} - DR \text{ east velocity (m/sec)} \end{vmatrix} \quad (34)$$

The Transit position fixes occur at irregular intervals, averaging about once every 90 minutes at low latitudes, and more frequently at higher latitudes.

As was mentioned, in order to be at all useful at high latitudes, the raw magnetic flux valve measurement must first be adjusted using a magnetic declination value. The software generates this magnetic declination using the IGRF85 geomagnetic field model, described in Malin, S.R.C., and Barraclough, D.R., Computers and Geosciences, Vol. 7 No. 4, 1981, pp. 401–405. This field model predicts all three components of the earth's magnetic field, which allows not only the magnetic declination to be calculated, but also the horizontal field strength and the dip angle, which can be used to give a reasonable indication of the accuracy that can be expected from the flux valve.

MEASUREMENT MATRIX

The relationship between the state vector X and the measurement vector Z must be described in detail for the Kalman filter to properly process the measurements. This description is expressed as a measurement equation:

$$Z = H*X + V \quad (35)$$

where H is the "measurement matrix" and V is the measurement noise vector. For the present invention, the measurement equation is:

$$Z = \begin{vmatrix} -1 & 1 & & & & & & \\ -1 & 0 & & & & & & \\ & & -1 & 0 & 1 & & & \\ & & 0 & -1 & 0 & & & \\ H51 & 0 & 0 & 0 & H55 & H56 & 1 & 0 \\ H61 & 0 & 0 & 0 & H65 & H66 & 0 & 1 \\ & & & & & & 1 & 0 \\ & & & & & & 0 & 1 \\ & & & & -S\sin\theta & S\cos\theta & & \\ & & & & S\cos\theta & S\sin\theta & & \end{vmatrix} \begin{vmatrix} X1 \\ X2 \\ X3 \\ X4 \\ X5 \\ X6 \\ X7 \\ X8 \end{vmatrix} + \begin{vmatrix} V1 \\ V2 \\ V3 \\ V4 \\ V5 \\ V6 \\ V7 \\ V8 \\ V9 \\ V10 \end{vmatrix} \quad (36)$$

where:

$S$ = vehicle speed (37)
$\theta$ = vehicle heading
$H51 = \cos(\psi) \tan(\sigma)$
$H61 = \sin(\psi) \tan(\sigma)$
$\psi$ = bearing to subpoint
$\sigma$ = maximum elevation angle The remaining four H components (H55, H56, H65 and H66), which define the sensitivity of the Transit fix to errors in velocity are related to the h matrix in equation 21 by a simple transformation:

$$\begin{vmatrix} H55 & H56 \\ H65 & H66 \end{vmatrix} = \begin{vmatrix} h11 & h12 \\ h21 & h22 \end{vmatrix} * \begin{vmatrix} -S\sin\theta & S\cos\theta \\ S\cos\theta & S\sin\theta \end{vmatrix} \quad (38)$$

The measurement noise vector V is defined as the non-Markov component of the measurement vector Z, given by equation (34). These are assumed to be uncorrelated white noise processes. The covariance matrix R of this noise vector is therefore diagonal of rank 10.

$$R = E(VV^T) = \begin{vmatrix} R1 & & & & & & & & & \\ & R2 & & & & & & & & \\ & & R3 & & & & & & & \\ & & & R4 & & & & & & \\ & & & & R5 & & & & & \\ & & & & & R6 & & & & \\ & & & & & & R7 & & & \\ & & & & & & & R8 & & \\ & & & & & & & & R9 & \\ & & & & & & & & & R10 \end{vmatrix} \quad (39)$$

where the numerical values of Ri i=1, 8 are all constants except for R2, R3, R7 and R8.

The GPS vertical, north and east noise R2, R7 and R8 are modelled simply as constants times the appropriate geometric dilution of precision (GDOP). These GDOPs are supplied by the receiver.

To estimate the magnetic heading noise covariance R3 we consider separately the "static" errors Rs caused by the random field fluctuations and the dynamically induced errors Rd, described by equations (11) and (12) respectively. Thus, letting $$R3 = Rs^2 + Rd^2 \quad (40)$$

where equation (11) implies that the level of the static noise Rs (since the field errors dX and dY are not known) is inversely proportional to the horizontal magnetic field strength. Of course a heading noise level of greater than $\pi$ radians (180°) is physically meaningless, so it is logical to express the static heading noise level (square root covariance in radians) in the form:

$$Rs = \frac{FL}{(H = FL/\pi)\sqrt{N}} \text{ radians} \quad (41)$$

where H is the local horizontal field strength in gammas, F is the low latitude field strength in gammas, (about 60,000$\gamma$) L is the low latitude magnetic heading noise level in radians and N is the number of samples averaged in the prefilter. The $1/\sqrt{N}$ reduction is noise is due to the prefilter averaging, assuming that the measurement noise is independent and less than $\pi$. Equation (41) will have the correct asymptotic values and approximately the correct H dependence. At low latitudes the magnetic noise FL is about 100$\gamma$, resulting in a low latitude magnetic heading noise Rs of about 0.0018 radians (0.1°). Of course at higher latitudes this increases considerably, for example at 65° latitude $-100°$ longitude H is about 4,600$\gamma$, resulting in a magnetic heading noise of about 0.02 radians (1.2°).

Equation (12) shows that the dynamically induced gimbal error produces a heading error that is also proportional to 1/H. Although the gimbal attitude and accelerations are unknown, since they are in response to the vehicle moving over rough terrain it is reasonable to approximate their effect as being proportional to the velocity:

$$Rd = \frac{CS}{H\sqrt{N}} \quad (42)$$

where S is the speed and C is an experimentally determined constant.

FILTER IMPLEMENTATION

The filter mechanisation used is Biermans UDU (see Bierman, G. J., "Factorization Methods for Discrete Sequential Estimation", New York, Academic Press, 1977), which offers both excellent numerical stability (preserving a positive definite symmetric covariance) and reasonably good computational efficiency. Since the state vector is quite small no special measures are required to reduce the processing burden.

Since it may be necessary to start the system in directional gyro mode without an adequate estimate of the initial heading, the present invention includes a "heading adjustment" parameter added to the directional gyro measurements before they are passed to the navigation filter. The value of this parameter is initially determined by using the magnetic flux measurement. This value will then be refined at an hourly rate by the Kalman filter itself. This is necessary whenever directional gyro mode is used for any substantial length of time (10 hours or so) because the growing directional gyro heading error will introduce serious nonlinearities into the filter equations. For example the linearized state transition equation (27) carries the implicit assumption that X5 (the gyro heading error) is small.

PREFILTER

To be as accurate and reliable as possible, any Kalman filter based integrated system should have a good prefilter to apply any known corrections to the measurements, to remove any spurious data and to detect sensor or subsystem failures.

To maximise the DR accuracy, the VRU must be carefully aligned to the vehicle's direction of motion, and the odometer scale factor must be carefully calibrated. The results of this alignment and calibration are used by the prefilter to offset the VRU measurement and scale the odometer measurements appropriately.

The magnetometer measurement would be useless without the geomagnetic field model, which allows the prefilter to convert from magnetic to geographic or true heading. The prefilter must also apply the magnetic calibration function for the vehicles permanent and induced fields, which is a function of the true and magnetic headings. Even this corrected and calibrated magnetic heading is very noisy. By averaging N magnetic measurements in the prefilter, the uncorrelated portion of this noise can be reduced by $1/\sqrt{N}$. Of course this can only be done over a short time interval over which the correlated error will not change appreciably, and it is the (gyro-magnetic) heading that is averaged, to remove the effect of heading change.

The prefilter must also convert the pressure measurement to height, using the standard atmosphere model, and the prefilter must form the map height measurement by reading grid heights from the database and interpolating.

The prefilter also uses various methods to detect spurious measurements and hard sensor failures, using known physical constraints on the vehicles speed, acceleration, turn rate etc. All measurements are first tested in this simple way, and if they pass this, they then undergo a residual test (see McMillan, J. C., "Optimal Compensation of Marine Navigation Sensor Errors", proceeding of the 7th IFAC/IFORS Symposium on Identification and System Parameter Estimation, York, U.K., July 1985). The residual test uses the Kalman filters estimate of what the measurement error should be, based on all previous measurements, along with the filter's covariance (degree of uncertainty in the estimate) based on the stochastic error models. This residual test is the most sensitive test, and the last line of defence before the measurement is processed by the filter. These two levels of failure detection significantly improve the accuracy and reliability of the system.

The embodiments of the invention in which an exclusive property of privilege is claimed are defined as follows:

1. A land navigation system for use in a vehicle, comprising, in combination:
   a plurality of sensors including:
      a magnetometer for providing a first output signal representative of the heading of said vehicle;
      a speed sensor for providing an output signal representative of the speed of said vehicle, said speed sensor being an odometer type of sensor operable to convert vehicle odometer cable rotation into electrical pulses;
      a gyrocompass for providing a second heading output signal and vehicle dynamic pitch and roll attitude output signals, said gyrocompass being capable of dual mode operation including a gyrocompass mode operable when said vehicle is stationary whereby to provide an initial heading output signal and a directional gyro mode operable when said vehicle is in motion;
      a baroaltimeter for providing an output signal representative of the altitude of said vehicle above a predetermined datum;
      receiver means for receiving satellite position transmissions and providing an output signal representative of the position of said vehicle, said receiver means including a single channel C/A code satellite receiver and a dual channel transit satellite receiver; and
   control means, including a microprocessor, arranged to receive the output of each said plurality of sensors and provide a continuous optimal estimate of position, altitude and heading of said vehicle, said control means including:
   display means for displaying the optimal estimate of position, altitude and heading of said vehicle, said display means including a first display monitor for displaying position, heading a desired heading information on a continuous basis and a central display for displaying time, position, heading, speed and desired heading on a continuous basis;
   means connected to each said sensors for obtaining said output signals at predetermined timed intervals, converting said output signals to a digital form to produce digitized output signals, said obtaining means including means for monitoring the output of said receiver means and transmitting receiver output signals to said obtaining means;
   means responsive to said digitized output signals for pre-filtering said digitized output signals to produce pre-filtered digitized output signals and delivering said pre-filtered digitized output signals to said display means and a Kalman filtering means, said means responsive to digitized output signals being further operable to integrate said heading and speed output signals over a predetermined period of time and compute therefrom, and the initial position of said vehicle at the beginning of said predetermined period of time, the current heading, speed and position of said vehicle;
   Kalman filtering means responsive to said pre-filtered digitized output signals for determining errors in said prefiltered digitized output signals and producing and delivering corrected pre-filtered digitized output signals to a memory means, said display means and said means responsive to digitized output signals;
   operator input means for enabling an operator to enter commands and data required or requested by said system into said system; and
   memory means for storing said output signals, said memory means including an elevation map referable by said Kalman filtering means for use in determining and bounding any error in said output signal representative of the altitude of said vehicle and a geo-magnetic field model referable by said Kalman filtering means for use in determining an error in said second output signal representative of the heading of said vehicle and an output signal representative of the attitude of said vehicle.

* * * * *